US011871010B2

(12) United States Patent
Egilmez et al.

(10) Patent No.: US 11,871,010 B2
(45) Date of Patent: Jan. 9, 2024

(54) EXTENDED LOW-FREQUENCY NON-SEPARABLE TRANSFORM (LFNST) DESIGNS WITH WORST-CASE COMPLEXITY HANDLING

(71) Applicant: QUALCOMM Incorporated, San Diego, CA (US)

(72) Inventors: Hilmi Enes Egilmez, San Diego, CA (US); Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 266 days.

(21) Appl. No.: 17/326,588

(22) Filed: May 21, 2021

(65) Prior Publication Data
US 2022/0109858 A1    Apr. 7, 2022

Related U.S. Application Data

(60) Provisional application No. 63/086,888, filed on Oct. 2, 2020.

(51) Int. Cl.
  *H04N 19/18*    (2014.01)
  *H04N 19/176*   (2014.01)
  (Continued)

(52) U.S. Cl.
  CPC .......... *H04N 19/18* (2014.11); *H04N 19/117* (2014.11); *H04N 19/159* (2014.11); *H04N 19/176* (2014.11)

(58) Field of Classification Search
  CPC .... H04N 19/18; H04N 19/117; H04N 19/159; H04N 19/176; H04N 19/625; H04N 19/61; H04N 19/157; H04N 19/70; H04N 19/12
  See application file for complete search history.

(56) References Cited

U.S. PATENT DOCUMENTS 10,306,229 B2   5/2019   Zhao et al.
10,349,085 B2   7/2019   Said et al.
(Continued)

FOREIGN PATENT DOCUMENTS

EP    3806475 A1     4/2021
WO    2020009556 A1  1/2020
WO    2020162737 A1  8/2020

OTHER PUBLICATIONS

Bross et al. "Versatile Video Coding (Draft 10)" JVET-S2001-vH, meeting Jun. 22-Jul. 1, 2020, version 17—date Sep. 4, 2020, from https://jvet-experts.org/ (Year: 2020).*

(Continued)

*Primary Examiner* — Joseph W Becker
(74) *Attorney, Agent, or Firm* — Shumaker & Sieffert, PA

(57) ABSTRACT

A video decoder can be configured to determine a number of allowed non-zero coefficients for a block of video data based on a size of the block; obtain a set of dequantized coefficients for the block, wherein the set of dequantized coefficients comprises a first subset of dequantized coefficients that includes non-zero dequantized coefficients and a second subset of dequantized coefficients that includes all zero coefficients, wherein a number of coefficients in the first subset of dequantized coefficients is equal to the number of allowed non-zero coefficients for the block of video data; apply an inverse low-frequency non-separable transform (LFNST) to the first subset of dequantized coefficients to determine a first intermediate subset of coefficients; and apply an inverse separable transform to the first intermediate subset of coefficients and at least a portion of the second subset of coefficients to determine a block of reconstructed residual values.

28 Claims, 15 Drawing Sheets

(51) Int. Cl.
*H04N 19/159* (2014.01)
*H04N 19/117* (2014.01)

(56) References Cited

U.S. PATENT DOCUMENTS

| | | | |
|---|---|---|---|
| 10,448,053 | B2 | 10/2019 | Said et al. |
| 10,491,922 | B2 | 11/2019 | Zhao et al. |
| 10,863,199 | B2 | 12/2020 | Said et al. |
| 10,972,733 | B2 | 4/2021 | Zhao et al. |
| 10,986,340 | B2 | 4/2021 | Egilmez et al. |
| 11,032,572 | B2 | 6/2021 | Egilmez et al. |
| 2021/0092381 | A1* | 3/2021 | Egilmez ............... H04N 19/176 |
| 2021/0314619 | A1 | 10/2021 | Jung et al. |

OTHER PUBLICATIONS

Bross B., et al., "Versatile Video Coding (Draft 10)," JVET-S2001-vH, Joint Video Experts Team (JVET) of ITU-T SG 16 WP 3 and ISO/IEC JTC 1/SC 29/WG 11, 19th Meeting: by teleconference, Jun. 22-Jul. 1, 2020, 551 Pages.

Bross B., et al., "Versatile Video Coding (Draft 6)," 127th MPEG, Jul. 8, 2019-Jul. 12, 2019, 15th JVET Meeting: Gothenburg, SE, Jul. 3, 2019-Jul. 12, 2019, Joint Video Experts Team (JVET) of ITU-T SG 16 WP 3 and ISO/IEC JTC 1/ SC 29/WG 11 (Motion Picture Expert Group or JVET of ISO/IEC JTC1/SC29/WG11 and ITU-T SG 16 WP 3), No. m49908, JVET-O2001-VE, Jul. 15, 2019 (Jul. 15, 2019), XP030208568, 455 Pages.

Chen J., et al., "Algorithm Description of Joint Exploration Test Model 7 (JEM7)," JVET-G1001-V1, Joint Video Exploration Team (JVET) of ITU-T SG 16 WP3 and ISO/IEC JTC 1/SC 29/WG 11, No. N17055, 7th Meeting, Jul. 13, 2017-Jul. 21, 2017, Torino, Aug. 19, 2017 (Aug. 19, 2017), XP030150980, 48 Pages, pages i-iv, Retrieved from the Internet: URL: http://phenix.int-evry.fr/jvet/doc_end_user/documents/7_Torino/wg11/JVET-G0001-v1.zip, section 2.3.5, paragraph [2.3.6], figures 15-18.

"Departments", Fraunhofer Heinrich Hertz Institute, 2021, https://www.hhi.fraunhofer.de/en/departments.html [retrieved on Sep. 21, 2021], pp. 1-4.

ITU-T H.265: "Series H: Audiovisual and Multimedia Systems Infrastructure of Audiovisual Services—Coding of Moving Video High Efficiency Video Coding," The International Telecommunication Union, Jun. 2019, 696 Pages.

Jain A.K., "A Sinusoidal Family of Unitary Transforms," IEEE Transactions on Pattern Analysis and Machine Intelligence, IEEE Service Center, vol. PAMI-1, No. 4, Oct. 1, 1979, XP011242370, pp. 356-365, ISSN: 0162-8828.

Koo (LGE) M., et al., "CE6: Reduced Secondary Transform (RST) (CE6-3.1)," 14th JVET Meeting, Mar. 19, 2019-Mar. 27, 2019, Geneva, CH (The Joint Video Exploration Team of ISO/IEC JTC1/SC29/WG11 and ITU-T SG.16 WP 3), No. JVET-N0193, Mar. 27, 2019 (Mar. 27, 2019), XP030256927, pp. 1-19, Retrieved from the Internet: URL: http://phenix.int-evry.fr/jvet/doc_end_user/documents/14_Geneva/wg11/JVET-N0193-v5.zip JVET-N0193 r3.docx, [retrieved on Mar. 27, 2019].

Chang Y-J., et al., "Compression Efficiency Methods Beyond VVC," Joint Video Experts Team (JVET) of ITU-T SG 16 WP 3 and ISO/IEC JTC 1/SC 29, JVET-U0100, 133. MPEG Meeting, 21st Meeting, by teleconference, Jan. 6-15, Jan. 11, 2021-Jan. 15, 2021, Online, (Motion Picture Expert Group or ISO/IEC JTC1/SC29/WG11), No. m5589031 Dec. 2020 (Dec. 31, 2020), XP030290689, pp. 1-13, Retrieved from the Internet: URL:https://dms.mpeg.expert/doc_end_user/documents/133_Teleconference/wg11/m55890-JVET-U0100-v1- [retrieved on Dec. 31, 2020].

Chen J., et al., "Algorithm Description for Versatile Video Coding and Test Model 10 (VTM 10)," 131. MPEG Meeting, 19th Meeting: by teleconference, Jun. 22-Jul. 1, 2020, Jun. 29, 2020-Jul. 3, 2020, Online, (Motion Picture Expert Group or ISO/IEC JTC1/SC29/WG11), No. m54825, Aug. 12, 2020 (Aug. 12, 2020), XP030293004, pp. 1-99, Retrieved from the Internet: URL:https://dms.mpeg.expert/doc_end_user/documents/131_Teleconference/wg11/m54825-JVET-S2002-v1-JVET-S2002-v1.zip JVET-S2002-v1.docx.

International Search Report and Written Opinion—PCT/US2021/052255—ISA/EPO—dated Jan. 4, 2022 18 Pages.

Lainema (Nokia) J: "CE6-Related: Simplified LFNST," 127. MPEG Meeting, 15th JVET Meeting, Jul. 8, 2019-Jul. 12, 2019, Gothenburg, (Motion Picture Expert Group or Joint Video Experts Team (JVET) of ITU-T SG16 WP3 and ISO/IEC JTC1/SC29/WG11), JVET-O0349, No. m48467, Jun. 25, 2019 (Jun. 25, 2019), XP030222078, 5 pages, Retrieved from the Internet: URL:http://phenix.int-evry.fr/mpeg/doc_end_user/documents/127_Gothenburg/wg11/m48467-JVET-O0349-v1-JVET-O0349.zip, JVET-O0349.docx [retrieved on Jun. 25, 2019].

* cited by examiner

EXTENDED LOW-FREQUENCY NON-SEPARABLE TRANSFORM (LFNST) DESIGNS WITH WORST-CASE COMPLEXITY HANDLING

This application claims the benefit of U.S. Provisional Patent Application 63/086,888, filed 2 Oct. 2020, the entire content of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

The techniques of this disclosure are related to transform coding. More specifically, this disclosure describes various low-frequency non-separable transform (LFNST) designs that may improve coding efficiency in Versatile Video Coding (VVC/H.266). The techniques of this disclosure may also be used in other advanced video codecs including extensions of HEVC and the next generation of video coding standards.

For hardware implementations, the worst-case number of multiplication (per-transform coefficient) may be an important complexity criterion. One simple technique for reducing the worst-case number of multiplications is to normatively zero-out some of the transform coefficients and have a maximum number of non-zero transform coefficients. In this context, a zeroed-out transform coefficient must be set equal to zero. In contrast, an allowed non-zero transform coefficient may be either zero or non-zero. In this regard, the number of allowed non-zero transform coefficients may represent a maximum possible number of non-zero transform coefficients, and an actual number of non-zero transform coefficients may be less than the maximum. Conversely, a number of zeroed-out transform coefficients may represent a minimum number of transform coefficients that equal zero, and an actual number of transform coefficients that equal zero may be greater than the minimum.

The zeroing-out process may reduce coding quality and thus may be undesirable unless required to meet a certain worst-case number of multiplications. In VVC, these criteria are hardwired for TU sizes, which in some coding scenarios, results in zeroing out more transform coefficients than necessary to meet worst-case number of multiplications criteria. To address this shortcoming, this disclosure describes techniques for determining a number of allowed non-zero transform coefficients as a function of the transform dimensions and the dimensions of the transform matrix (including the number of "support samples"). By determining a number of allowed non-zero coefficients for a block of video data based on a size of the block, a video decoder operating according to the techniques of this disclosure may avoid unnecessarily zeroing out coefficients when not needed, while still complying with worst-case multiplication criterion.

According to one example, a method of decoding video data includes determining a number of allowed non-zero coefficients for a block of video data based on a size of the block; obtaining a set of dequantized coefficients for the block of video data, wherein the set of dequantized coefficients comprises a first subset of dequantized coefficients that includes non-zero dequantized coefficients and a second subset of dequantized coefficients that includes all zero coefficients, wherein a number of coefficients in the first subset of dequantized coefficients is equal to the number of allowed non-zero coefficients for the block of video data; applying an inverse low-frequency non-separable transform (LFNST) to the first subset of dequantized coefficients to determine a first intermediate subset of coefficients; and applying an inverse separable transform to the first intermediate subset of coefficients and at least a portion of the second subset of coefficients to determine a block of reconstructed residual values.

According to another example, a device for decoding video data includes a memory configured to store video data and one or more processors implemented in circuitry and configured to determine a number of allowed non-zero coefficients for a block of video data based on a size of the block; obtain a set of dequantized coefficients for the block of video data, wherein the set of dequantized coefficients comprises a first subset of dequantized coefficients that includes non-zero dequantized coefficients and a second subset of dequantized coefficients that includes all zero coefficients, wherein a number of coefficients in the first subset of dequantized coefficients is equal to the number of allowed non-zero coefficients for the block of video data; apply an inverse low-frequency non-separable transform (LFNST) to the first subset of dequantized coefficients to determine a first intermediate subset of coefficients; and apply an inverse separable transform to the first intermediate subset of coefficients and at least a portion of the second subset of coefficients to determine a block of reconstructed residual values.

According to another example, a computer-readable storage medium stores instructions that when executed by one or more processors cause the one or more processors to determine a number of allowed non-zero coefficients for a block of video data based on a size of the block; obtain a set of dequantized coefficients for the block of video data, wherein the set of dequantized coefficients comprises a first subset of dequantized coefficients that includes non-zero dequantized coefficients and a second subset of dequantized coefficients that includes all zero coefficients, wherein a number of coefficients in the first subset of dequantized coefficients is equal to the number of allowed non-zero coefficients for the block of video data; apply an inverse low-frequency non-separable transform (LFNST) to the first subset of dequantized coefficients to determine a first intermediate subset of coefficients; and apply an inverse separable transform to the first intermediate subset of coefficients and at least a portion of the second subset of coefficients to determine a block of reconstructed residual values.

According to another example, a device for decoding video data includes means for determining a number of allowed non-zero coefficients for a block of video data based on a size of the block; means for obtaining a set of dequantized coefficients for the block of video data, wherein the set of dequantized coefficients comprises a first subset of dequantized coefficients that includes non-zero dequantized coefficients and a second subset of dequantized coefficients that includes all zero coefficients, wherein a number of coefficients in the first subset of dequantized coefficients is equal to the number of allowed non-zero coefficients for the block of video data; means for applying an inverse low-frequency non-separable transform (LFNST) to the first subset of dequantized coefficients to determine a first intermediate subset of coefficients; and means for applying an inverse separable transform to the first intermediate subset of coefficients and at least a portion of the second subset of coefficients to determine a block of reconstructed residual values.

The details of one or more examples are set forth in the accompanying drawings and the description below. Other features, objects, and advantages will be apparent from the description, drawings, and claims.

BRIEF DESCRIPTION OF DRAWINGS

Figure 5:
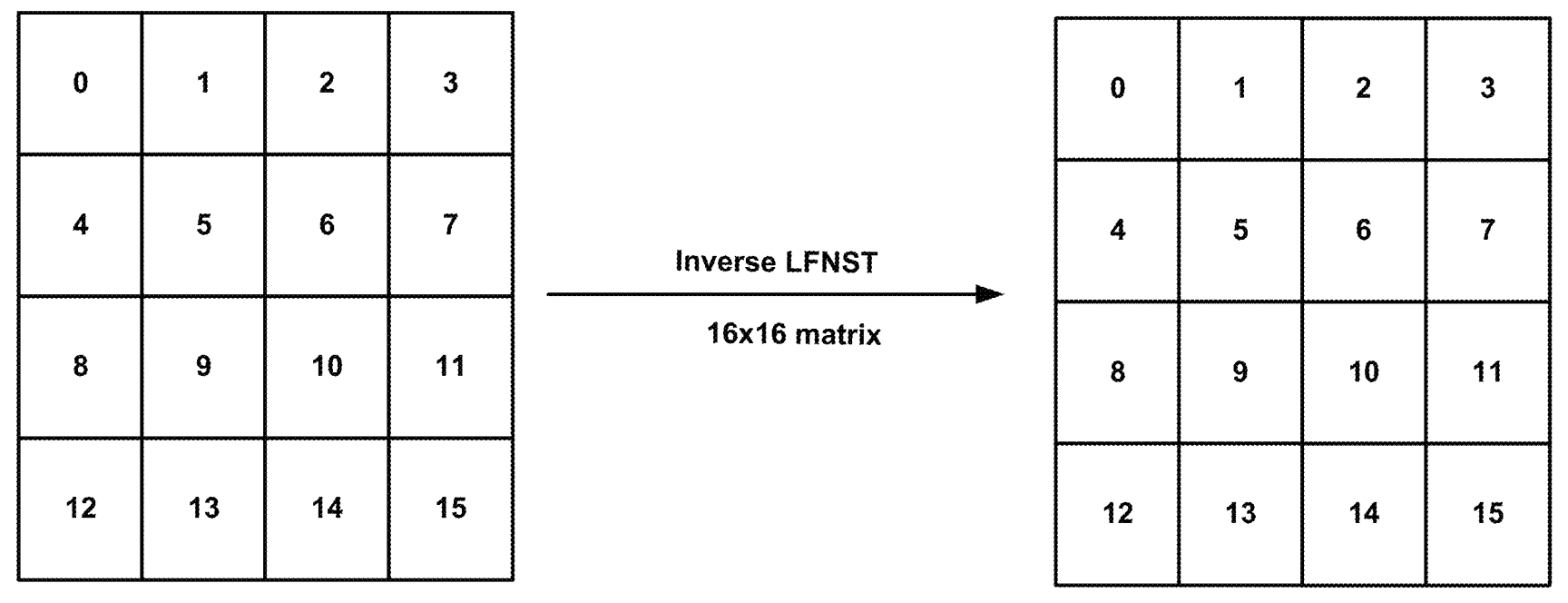

FIG. 5 is a conceptual diagram illustrating an 4×4 inverse LFNST used to reconstruct 16 intermediate coefficients from a list of 16 input coefficients.

FIG. 6 shows an illustration of 8×8 inverse LFNST used to reconstruct 48 intermediate coefficients form a list of 16 input coefficients.

FIG. 8 shows an example of input reorganization based on raster-scan with 16 decoded coefficients.

FIG. 9 shows an example of input reorganization based on raster-scan with 64 decoded coefficients.

FIG. 10 shows an illustration of 8×8 inverse LFNST used to reconstruct 64 intermediate coefficients from 16 input coefficients.

DETAILED DESCRIPTION

Figure 1:
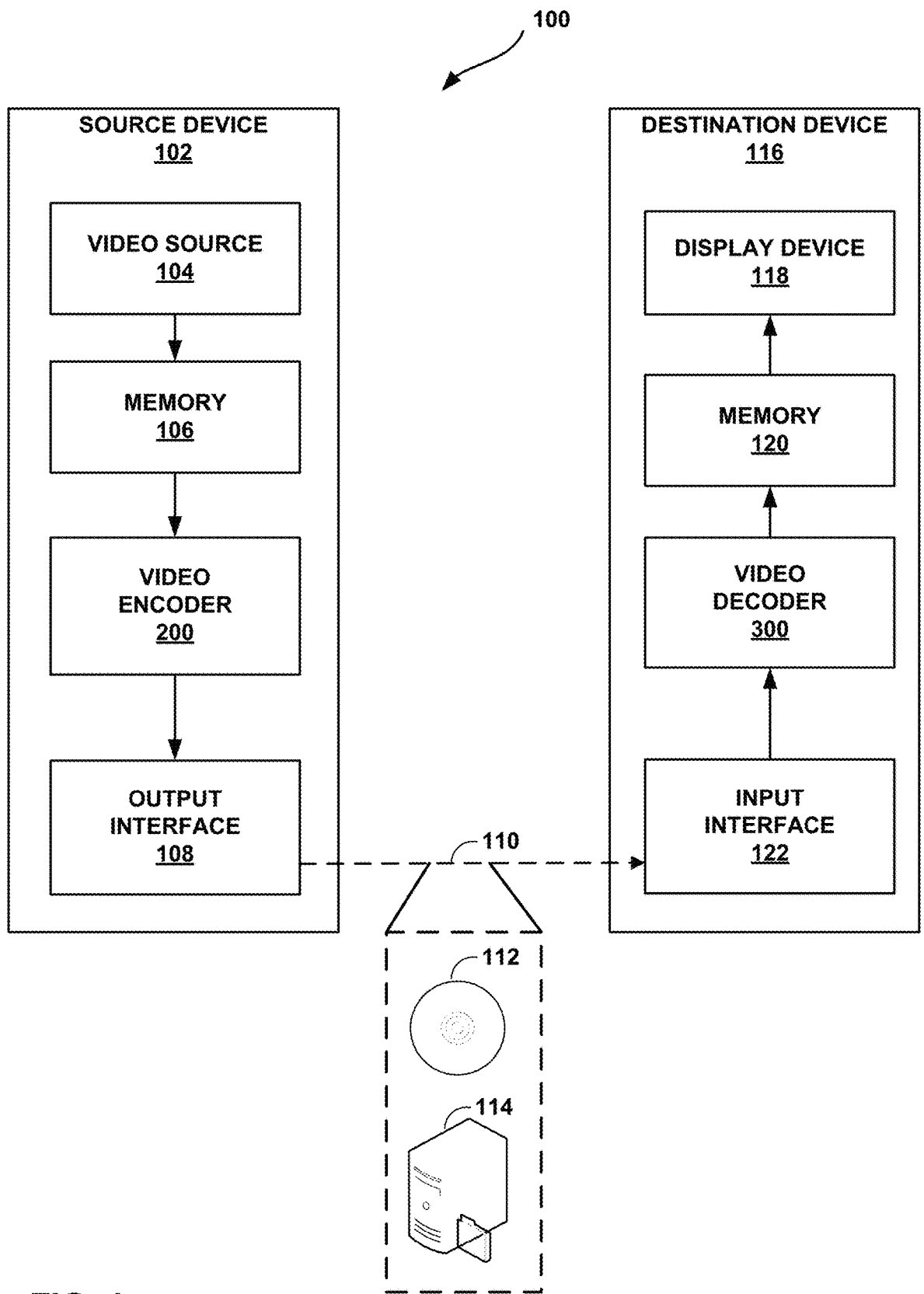
FIG. 1 is a block diagram illustrating an example video encoding and decoding system that may perform the techniques of this disclosure.

Video coding (e.g., video encoding and/or video decoding) typically involves predicting a block of video data from either an already coded block of video data in the same picture (e.g., intra prediction) or an already coded block of video data in a different picture (e.g., inter prediction). In some instances, the video encoder also calculates residual data by comparing the prediction block to the original block. Thus, the residual data represents a difference between the prediction block and the original block. To reduce the number of bits needed to signal the residual data, the video encoder transforms and quantizes the residual data and signals the transformed and quantized residual data in the encoded bitstream. The compression achieved by the transform and quantization processes may be lossy, meaning that transform and quantization processes may introduce distortion into the decoded video data.

A video decoder decodes and adds the residual data to the prediction block to produce a reconstructed video block that matches the original video block more closely than the prediction block alone. Due to the loss introduced by the transforming and quantizing of the residual data, the first reconstructed block may have distortion or artifacts. One common type of artifact or distortion is referred to as blockiness, where the boundaries of the blocks used to code the video data are visible.

To further improve the quality of decoded video, a video decoder can perform one or more filtering operations on the reconstructed video blocks. Examples of these filtering operations include deblocking filtering, sample adaptive offset (SAO) filtering, and adaptive loop filtering (ALF). Parameters for these filtering operations may either be determined by a video encoder and explicitly signaled in the encoded video bitstream or may be implicitly determined by a video decoder without needing the parameters to be explicitly signaled in the encoded video bitstream.

The techniques of this disclosure are related to transform coding. More specifically, this disclosure describes various low-frequency non-separable transform (LFNST) designs that may improve coding efficiency in Versatile Video Coding (VVC/H.266). The techniques of this disclosure may also be used in other advanced video codecs including extensions of HEVC and the next generation of video coding standards.

When implementing LFNST, a video decoder performs a coefficient decoding step to obtain a list of 2-D dequantized coefficient. The decoder applies an inverse LFNST to reconstruct a subset of coefficients. Then, the video decoder uses an inverse separable transform (e.g., DCT-2) to reconstruct residuals in a 2-D block/array. In some examples, a video decoder may use larger transform matrices (increase in number of support samples), and accordingly, a larger number of transform sets and candidates to allow for matrices optimized for more intra prediction modes.

For hardware implementations, the worst-case number of multiplication (per-transform coefficient) may be an important complexity criterion. One simple technique for reducing the worst-case number of multiplications is to normatively zero-out some of the transform coefficients and have a maximum number of non-zero transform coefficients. In this context, a zeroed-out transform coefficient must be set equal to zero. In contrast, an allowed non-zero transform coefficient may be either zero or non-zero. In this regard, the number of allowed non-zero transform coefficients may represent a maximum possible number of non-zero transform coefficients, and an actual number of non-zero transform coefficients may be less than the maximum. Conversely, a number of zeroed-out transform coefficients may represent a minimum number of transform coefficients that equal zero, and an actual number of transform coefficients that equal zero may be greater than the minimum.

The zeroing-out process may reduce coding quality and thus may be undesirable unless required to meet a certain worst-case number of multiplications. In VVC, these criteria are hardwired for TU sizes, which in some coding scenarios, results in zeroing out more transform coefficients than necessary to meet worst-case number of multiplications criteria. To address this shortcoming, this disclosure describes techniques for determining a number of allowed non-zero transform coefficients as a function of the transform dimensions and the dimensions of the transform matrix (including the number of "support samples"). By determining a number of allowed non-zero coefficients for a block of video data based on a size of the block, a video decoder operating according to the techniques of this disclosure may avoid unnecessarily zeroing out coefficients when not needed, while still complying with worst-case multiplication criterion.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Each of source device 102 and destination device 116 may be any one or more of a wide range of devices, including a desktop computer, a notebook (i.e., laptop) computer, a mobile device, a tablet computer, a set-top box, a telephone handset such as a smartphone, a television, a camera, a display device, a digital media player, a video gaming console, a video streaming device, a broadcast receiver device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the LFNST techniques described herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform the LFNST techniques described herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication standard. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A draft of the VVC standard is described in Bross, et al. "Versatile Video Coding (Draft 10)," Joint Video Experts Team (JVET) of ITU-T SG 16 WP 3 and ISO/IEC JTC 1/SC 29/WG 11, 18th Meeting: by teleconference, 22 Jun.-1 Jul. 2020, JVET-52001-v17 (hereinafter "VVC Draft 10"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
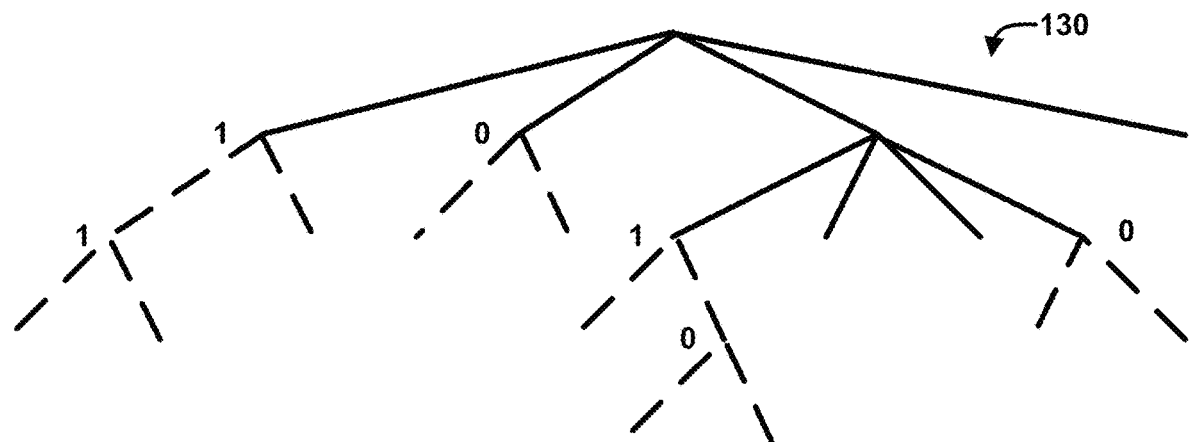
FIGS. 2A and 2B are conceptual diagrams illustrating an example quadtree binary tree (QTBT) structure, and a corresponding coding tree unit (CTU).
Figure 2B:
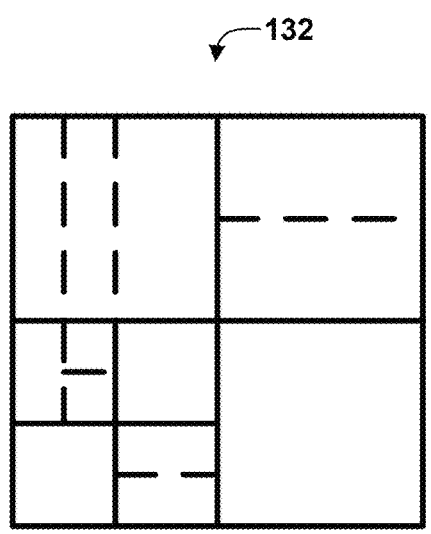

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. A binary tree node having a width equal to MinBTSize (4, in this example) implies that no further vertical splitting (that is, dividing of the width) is permitted for that binary tree node. Similarly, a binary tree node having a height equal to MinBTSize implies no further horizontal splitting (that is, dividing of the height) is permitted for that binary tree node. As noted above, leaf nodes of the binary tree are referred to as CUs, and are further processed according to prediction and transform without further partitioning.

In example video coding standards prior to HEVC, only a fixed separable transform is used where DCT-2 is used both vertically and horizontally. In HEVC, in addition to DCT-2, DST-7 is also employed for 4×4 blocks as a fixed separable transform.

U.S. Patent Publication 2016-0219290-A1, U.S. Patent Publication 2018-0020218-A1, and U.S. Patent Publication 2019-0373261-A1 describe techniques for multiple transform selection (MTS). MTS may also be referred to as Adaptive Multiple Transforms (AMT). An example of MTS in 2019-0373261-A1 has been adopted in Joint Video Experts Team (JVET) of ITU-T SG 16 WP 3 and ISO/IEC JTC 1/SC 29/WG 11, JEM Software, https://jvet.hhi.fraunhofer.de/svn/svn_HMJEMSoftware/tags/HM-16.6-JEM-7.0 (JEM 7.0), and later a simplified version of MTS is adopted in VVC Draft 10.

Figure 3:
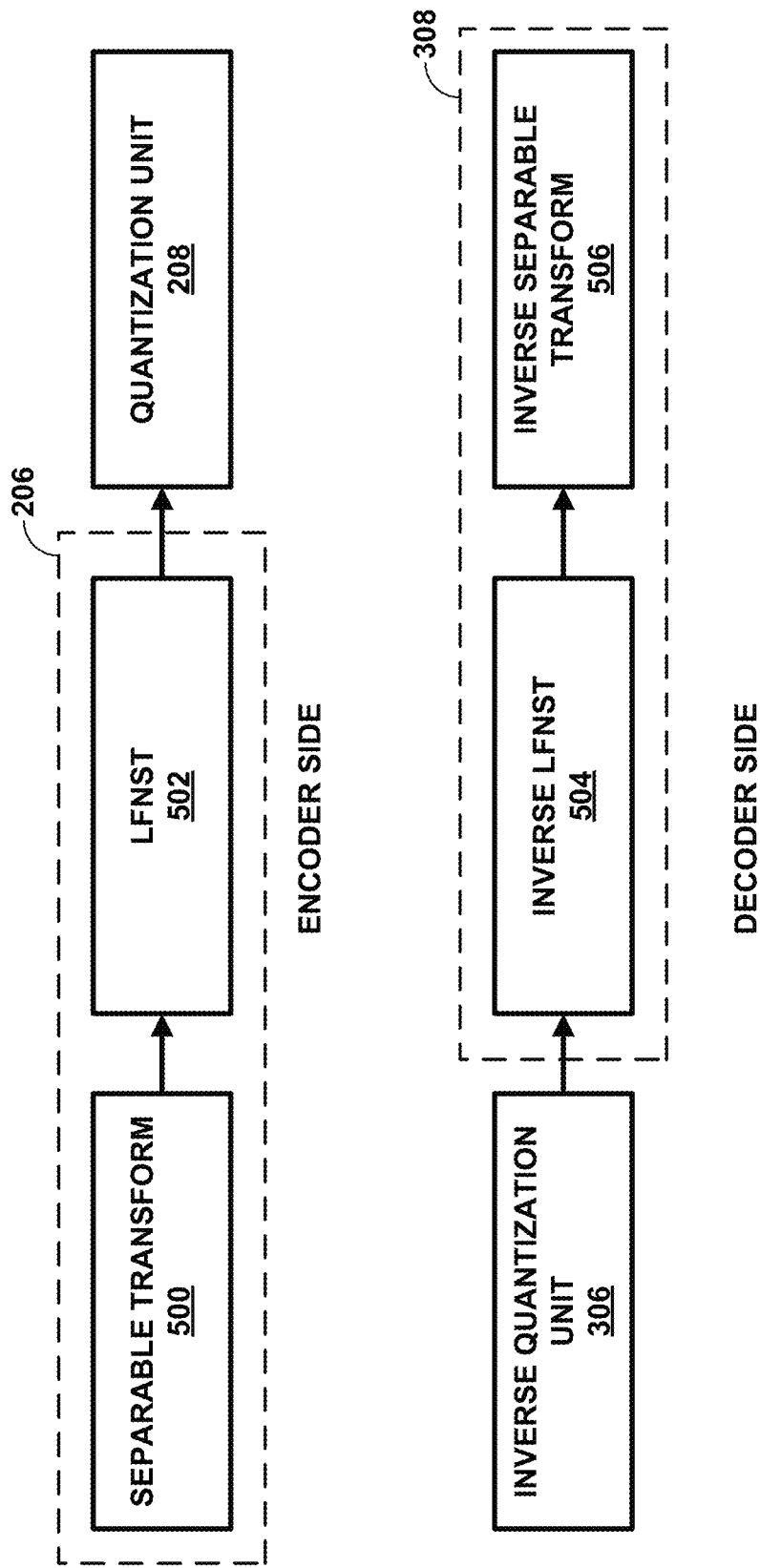
FIG. 3 is a block diagram illustrating an example low-frequency non-separable transform (LFNST) at an encoder and a decoder.

FIG. 3 is an illustration of an example LFNST performed by a video encoder and video decoder (e.g., video encoder 200 and video decoder 300), where the use of an LFNST introduces a new stage between separable transformation and quantization in a codec. As shown in FIG. 3, at the encoder side (e.g., video encoder 200), transform processing unit 206 may first apply a separable transform 500 on a transform block to obtain transform coefficients. Transform processing unit 206 may then apply an LFNST 502 to a portion (e.g., an LFNST region) of the transform coefficients of the transform block. As described above, transform processing unit 206 may apply a zero-out process in conjunction with the LFNST. Quantization unit 208 may then quantize the resulting transform coefficients before entropy encoding. Transform processing unit 206 and quantization unit 208 are described in more detail with respect to FIG. 12.

At the decoder side (e.g., video decoder 300), inverse quantization unit 306 first inverse quantizes entropy decoded transform coefficients in a transform block. Then inverse transform processing unit 308 of video decoder 300 applies an inverse LFNST 504 to an LFSNT region of the transform block. Then inverse transform processing unit 308 applies an inverse separable transform 506 to results of the inverse LFNST to produce a residual block. Inverse quantization unit 306 and inverse transform processing unit 308 are described in more detail with respect to FIG. 13.

LFNST, as illustrated in FIG. 3, is used in JEM-7.0 to further improve the coding efficiency of MTS, where an implementation of LFNST is based on HyGT as described in U.S. Patent Publication 2017-0238013-A1. U.S. Patent Publication 2017-0094313-A1, U.S. Patent Publication 2017-0238014-A1, U.S. Provisional Patent Application 62/668,105, filed & May 2018, and U.S. Patent Publication 2019-0297351-A1 also describe additional designs and further details. LFNST has been adopted in VVC Draft 10 and is described in JVET-N0193, Reduced Secondary Transform (RST) (CE6-3.1), 14th Meeting: Geneva, CH, 19-27 Mar. 2019. LFNST may also be referred to as non-separable secondary transform (NSST) or secondary transform.

FIG. 3 shows an illustration of LFNST transform, which may be performed by a video encoder and video decoder where LFNST introduces a new stage between separable transformation and quantization in a codec.

The decoding process for LFNST will now be described. The inverse transformation with LFNST involves following main steps as illustrated in FIG. 4:

1) The decoded transform coefficients (see subblock 315 in FIG. 4) are used as input to the inverse LFNST by first converting the 2-D block into a 1-D list (or vector) of coefficients via pre-defined scanning/ordering;
2) An inverse LFNST is applied to the 1-D list of input coefficients and the output coefficients are reorganized into 2-D block via pre-defined scanning/ordering (see subblock 317 in FIG. 4);
3) The inverse transformed LFNST coefficients are used as input the separable inverse DCT-2 to obtain reconstructed residuals.

Figure 4:
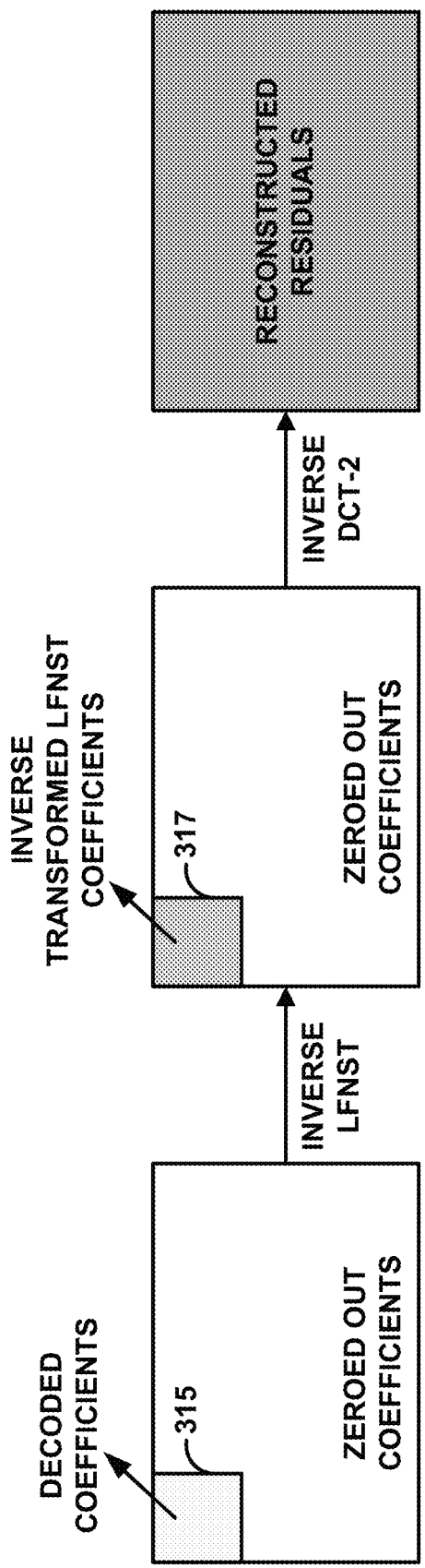
FIG. 4 is a conceptual diagram illustrating an inverse transform process when LFNST is used.

FIG. 4 shows an illustration of inverse transform process when LFNST is used.

In VVC Draft 10, LFNST can be applied to 4×4 and 8×8 subblocks. In both cases, 16 decoded coefficients in a 4×4 subblock (some of which may be normatively zeroed-out) are input to an inverse LFNST:

For the 4×4 case, a 16×16 inverse LFNST is used to construct 16 intermediate coefficients before the separable inverse DCT-2 as shown in FIG. 5.

Figure 6:
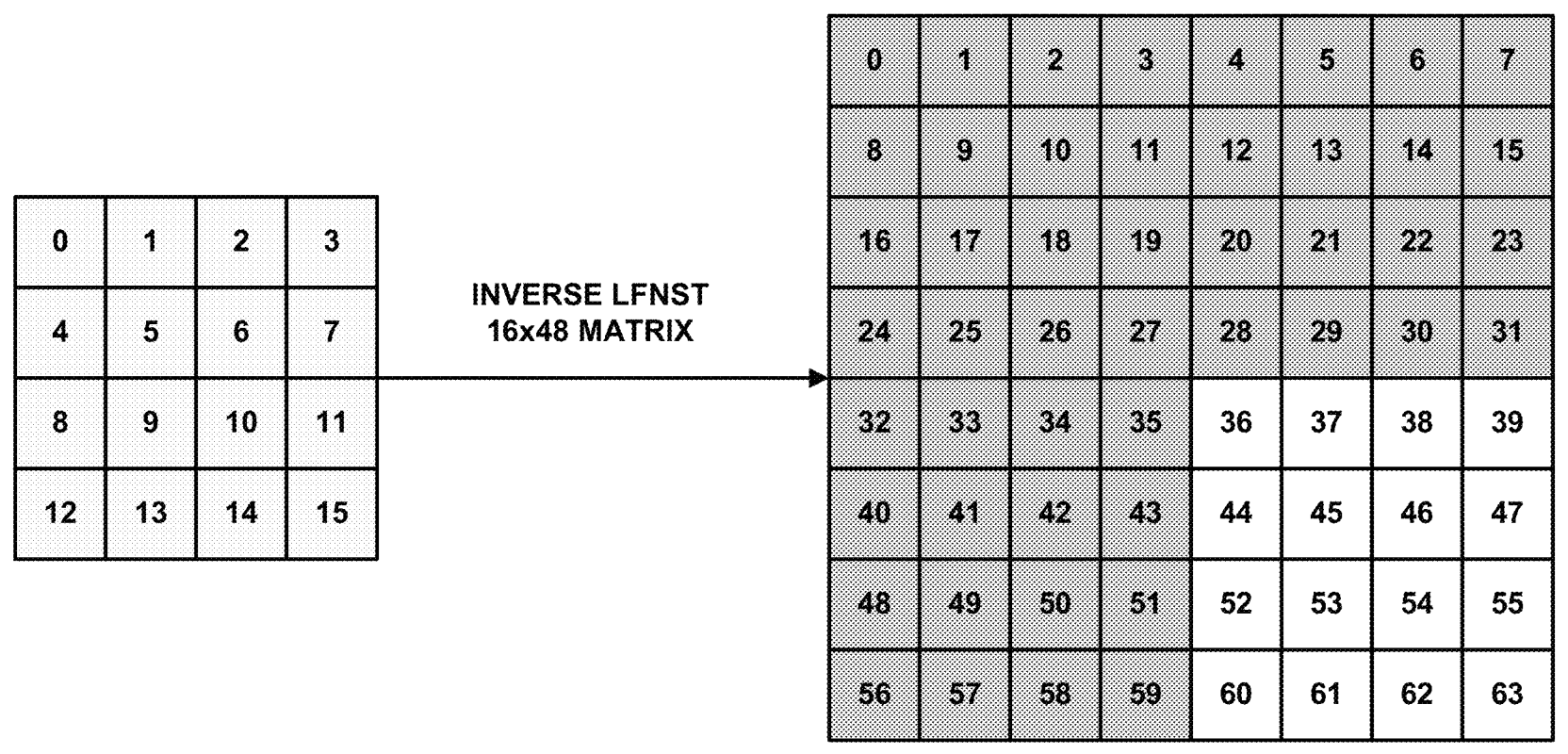

For the 8×8 case, a 16×48 inverse LFNST is used to construct 48 intermediate coefficients before the separable inverse DCT-2 as shown in FIG. 6. Note that 48 intermediate coefficients are reorganized in an L-shaped pattern.

An inverse LFNST processes can be fully defined based on (i) a transform (i.e., LFNST) matrix and (ii) a reorganization pattern/scan for intermediate coefficients.

The details of the zero-out process in VVC Draft 10 are described in U.S. patent application Ser. No. 15/931,271, filed 13 May 2020.

FIG. 5 shows an illustration of 4×4 inverse LFNST used to reconstruct 16 intermediate coefficients form a list of 16 input coefficients.

For a 4×4 LFNST, the following two patterns/scans are used depending on intra mode:

*const* in g_lfnstRGScan4x4 [16] =

{ // 0 1 2 3 4 5 6 7 8 9 10 11 12 13 14 15

0, 1, 2, 3, 4, 5, 6, 7, 8, 9, 10, 11, 12, 13, 14, 15

};

*const int* g_lfnstRGTranScan4x4[16] =

{ // 0 1 2 3 4 5 6 7 8 9 10 11 12 13 14 15

0, 1, 2, 3, 4, 5, 6, 7, 8, 8, 9, 10, 11, 12, 13, 14, 15

};

where above two patterns/scans indicate the reordering of intermediate coefficients. For example, g_lfnstRGScan4×4 does not change the row-major reordering of coefficients. However, lfnstRGTranScan4×4 reorders by transposing the order of coefficients (e.g., coefficients at 1, 2, 3, 6, 7 and 11 are swapped with coefficients at 4, 8, 12, 9, 13 and 14, respectively).

For 4×4 LFNST, there are eight 16×16 matrices in VVC Draft 10. These are listed in Section 8.7.4.3 of 7VET-02001.

FIG. 6 shows an illustration of 8×8 inverse LFNST used to reconstruct 48 intermediate coefficients form a list of 16 input coefficients. The intermediate coefficients are reorganized in an L-shaped pattern.

For an 8×8 LFNST, the following two patterns/scans are used depending on intra mode:

```
const int g_lfnstRGScan8x8 [48] =
{ // 0 1 2 3 4 5 6 7 8 9 10 11 12 13 14 15 16 17 18 19 20 21 22 23
24 25 26 27 28 29 30 31 32 33 34 35 36 37 38 39 40 41 42 43 44 45 46
47
    0, 1, 2, 3, 4, 5, 6, 7, 8, 9, 10, 11, 12, 13, 14, 15, 16, 17, 18, 19, 20, 21, 22, 23,
24, 25, 26, 27, 28, 29, 30, 31, 32, 33, 34, 35, 36, 37, 38, 39, 40, 41, 42, 43, 44, 45, 46, 47, 48, 49, 50, 51, 56, 57, 58,
59
};
const int g_lfnstRGTranScan8x8[48] =
{ // 0 1 2 3 4 5 6 7 8 9 10 11 12 13 14 15 16 17 18 19 20 21 22 23
24 25 26 27 28 29 30 31 32 33 34 35 36 37 38 39 40 41 42 43 44 45 46
47
0, 8, 16, 24, 32, 40, 48, 56, 1, 9, 17, 25, 33, 41, 49, 57, 2, 10, 18, 26, 34, 42, 50,
58, 3, 11, 19, 27, 35, 43, 51, 59, 4, 12, 20, 28, 5, 13, 21, 29, 6, 14, 22, 30, 7, 15, 23,
31
};
``` where above two patterns/scans indicate the reordering of intermediate coefficients. Specifically, g_lfnstRGScan8×8 reorganizes 48 intermediate coefficients in the L-shaped pattern (e.g., the 48th coefficient is mapped to location 59 in FIG. 6). The scan lfnstRGTranScan4×4 reorders in the L-shaped pattern by transposing coefficients (e.g., the 48th coefficient is mapped to location 31 in FIG. 6).

For 8×8 LFNST, there are eight 16×48 matrices in VVC Draft 10. These are listed in Section 8.7.4.3 of JVET-02001.

For both 4×4 and 8×8 LFNST in VVC Draft 10, 8 LFNST matrices are divided into 4 sets of LFNST matrices, each of which consist of 2 LFNST candidates. Transform matrix used for decoding is determined by signaling an LFNST index, which identifies the transform matrix used among 2 LFNST candidates in a given transform set. In VVC Draft 10, the transform set is derived based on intra modes. Specifically, it is derived according to the following table Mapping Rules for Four LFNST Sets in VVC Draft 10

| predModeIntra | lfnstTrSetIdx |
|---|---|
| predModeIntra < 0 | 1 |
| 0 <= predModeIntra <= 1 | 0 |
| 2 <= predModeIntra <= 12 | 1 |
| 13 <= predModeIntra <= 23 | 2 |
| 24 <= predModeIntra <= 44 | 3 |
| 45 <= predModeIntra <= 55 | 2 |
| 56 <= predModeIntra <= 80 | 1 |

This disclosure describes techniques for extending the LFNST designs of VVC Draft 10. The proposed techniques aim to improve the LFNST design by introducing additional transform sets and candidates and provide techniques to handle worst-case complexity in terms of number of multiplications (i.e., multiplications per coefficient).

This disclosure also describes aspects of an LFNST decoding process. After a list of 2-D dequantized coefficients are obtained (based on a coefficient decoding step), a decoder (e.g., video decoder 300) may apply an inverse low-frequency non-separable transform (LFNST) to reconstruct a subset of coefficients. Then, an inverse separable transform (e.g., DCT-2) is used to reconstruct residuals in a 2-D block/array (see e.g., FIG. 4).

An LFNST decoding process can be specified based on the following:
  Reorganization patterns/scans, which are used to define how LFNST input and output coefficients are organized.
  A transform matrix, defining the non-separable transform used for a subset of decoded coefficients.

Figure 7:
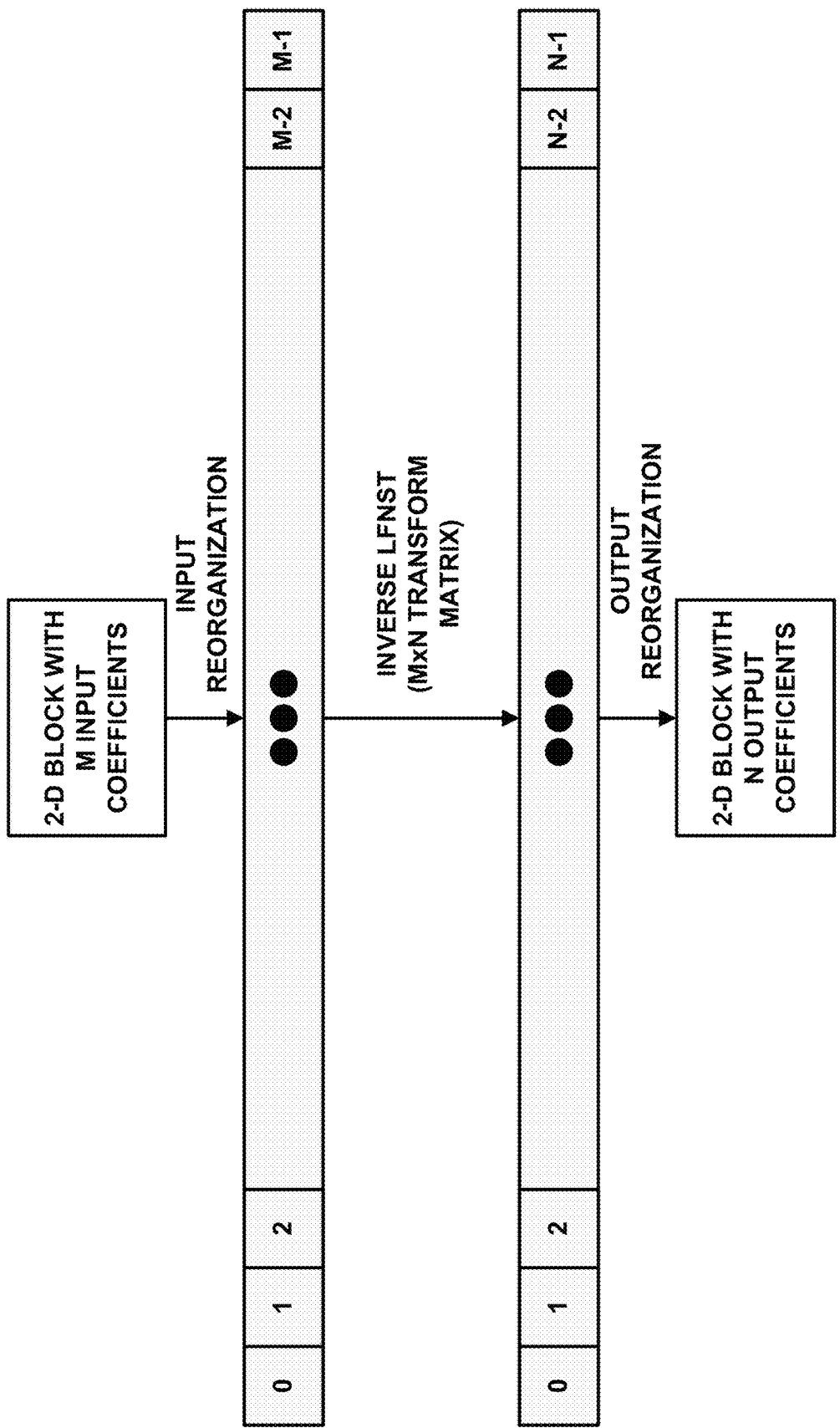
FIG. 7 shows an illustration of inverse LFNST process.

In LFNST, a 2-D block/array of decoded coefficients may be organized in order to align the entries of matrices and the input. As illustrated in FIG. 7, this can be achieved by:
  i) constructing a 1-D list of coefficients M from the 2-D array of coefficients, then
  ii) an inverse LFNST (of size M×N) is applied on the 1-D list to reconstruct N LFNST coefficients, and
  iii) the output coefficients are reorganized in a 2-D block/array, which are input to the separable transform (inverse DCT-2) reconstructing the residual block.

In VVC Draft 10, the LFNST design allows at most M=16 non-zero coefficients (located at top-left 4×4 subblock) while the rest of the coefficients are normatively set to be zeros as shown in FIG. 7. However, the ideas in this disclosure may be applied for designs that allow all coefficients to be non-zeros. One example may be the case where M=N. In another example, none of the coefficients are normatively zeroed-out.

Figures 8, 9:
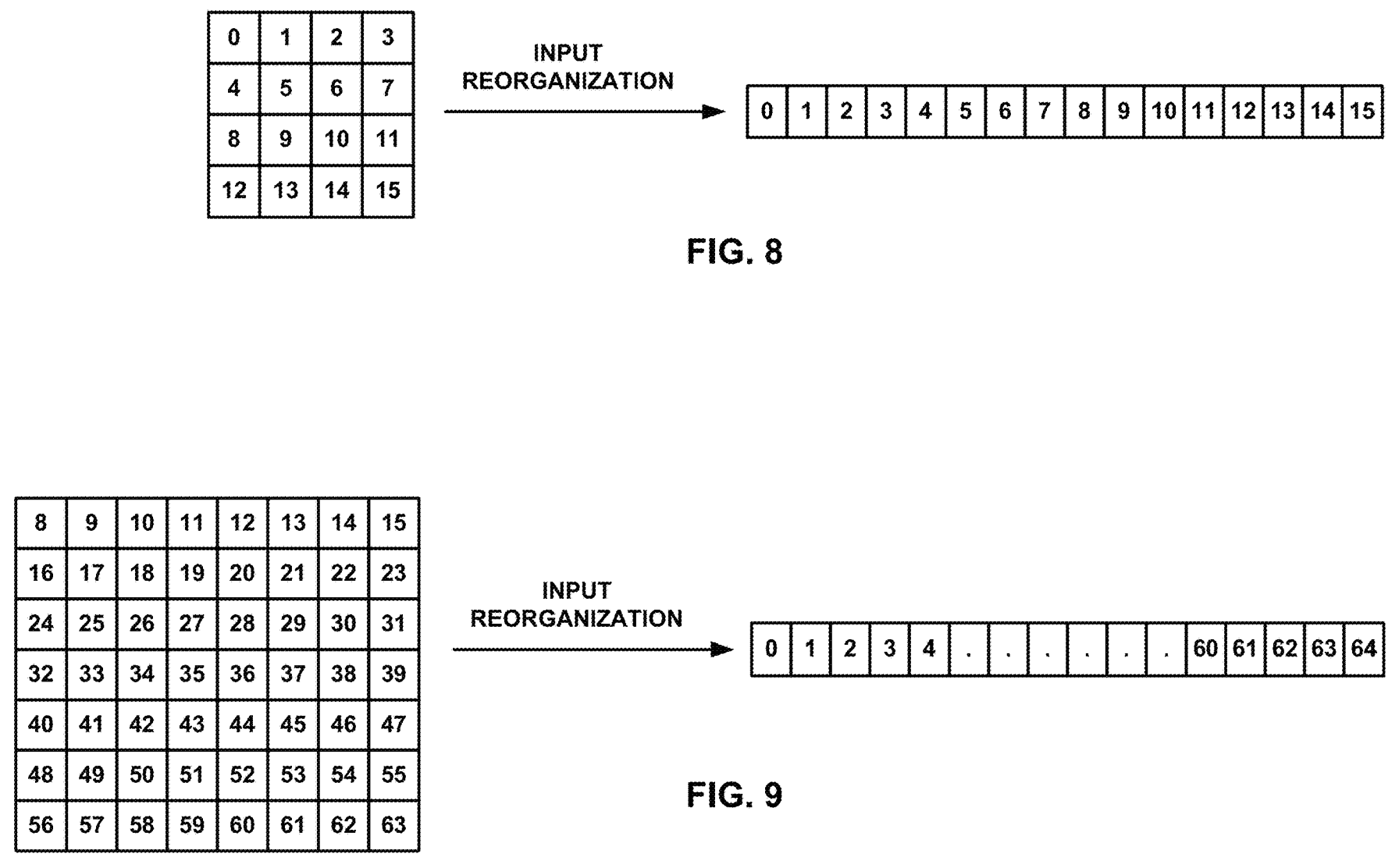

FIG. 7 shows an illustration of inverse LFNST process.
Input Reorganization:
  For example, the reorganization can be done in raster-scan (also called row-major ordering as shown in FIG. 8).
  As another example, the reorganization can be done in column-major ordering.

The reorganization can also depend on block size and intra mode.

If a codec (e.g., video encoder 200 or video decoder) normatively sets a subset of input coefficients to be zeroed-out, then input coefficient list for LFNST may not include those zeroed-out coefficients. The reorganization step only allows coefficients that can be non-zero (i.e., coefficients that are not normatively zeroed out).

FIG. 8 shows an example of input reorganization based on raster-scan with 16 decoded coefficients. FIG. 9 shows an example of input reorganization based on raster-scan with 64 decoded coefficients.

Transform Matrix:

The transform (LFNST) matrix can be of size M×N, where
- M denotes the number of basis vectors and also denotes the number of rows
- N denotes the number of reconstructed LFNST coefficients after applying the transform (also known as the number of support samples for the transform).

The transform matrix entries can be in 8-bit, 9-bit or 10-bit precision.

The signs of all entries in a row of the transform matrix can be flipped. In other words, a row-vector in the transform matrix can be multiplied by −1.

All rows in the transform matrix can be multiplied by −1.

A subset of rows in the transform matrix can be multiplied by 1 while the other entries are unchanged.

Output Reorganization Patterns/Scans:

A 1-D list of N output LFNST coefficients can be reorganized based on an array (defining a pattern/scan), where each value in the array corresponds to a position/location in a 2-D block.

The values in the array (used for reorganization) can denote indices of a 2-D block in any pre-defined order.

In one example, the index values can correspond to a position in a 2-D block. Given an index value v, the corresponding position in the 2-D block can be calculated as:

$r=\text{floor}(v/w)$      row index:

$c=\text{mod}(v,w)$      column index:

where w denotes the width of the LFNST subblock (in VVC Draft 10, w can be 4 or 8). Based on this formula, the following array for reorganization pattern corresponds to the raster-order for 4×4 blocks:

*const int* raster_order [16] =

{ // 0 1 2 3 4 5 6 7 8 9 10 11 12 13 14 15

0, 1, 2, 3, 4, 5, 6, 7, 8, 9, 10, 11, 12, 13, 14, 15,

};

so that i-th element in the 1-D coefficient list is mapped to the row and column positions in 2-D block as for i=0, 1, . . . 15:

$r[i]=\text{floor}(\text{raster\_order}[i]/w)$ $c[i]=\text{mod}(\text{raster\_order}[i],w)$ In the examples above, N is the same value as in M×N and is also equal to the number of reconstructed coefficients at the decoder side. M is the number of input coefficients associated with M rows of an M×N matrix.

N: number of output/reconstructed coefficients that is equal to number of columns (i.e., N) in the matrix.

This disclosure also describes techniques for extending the 8×8 LFNST support with/without zero-out. The 8×8 LFNST design in VVC Draft 10 can be extended to have a larger support for reconstructed LFNST coefficients.

Figure 10:
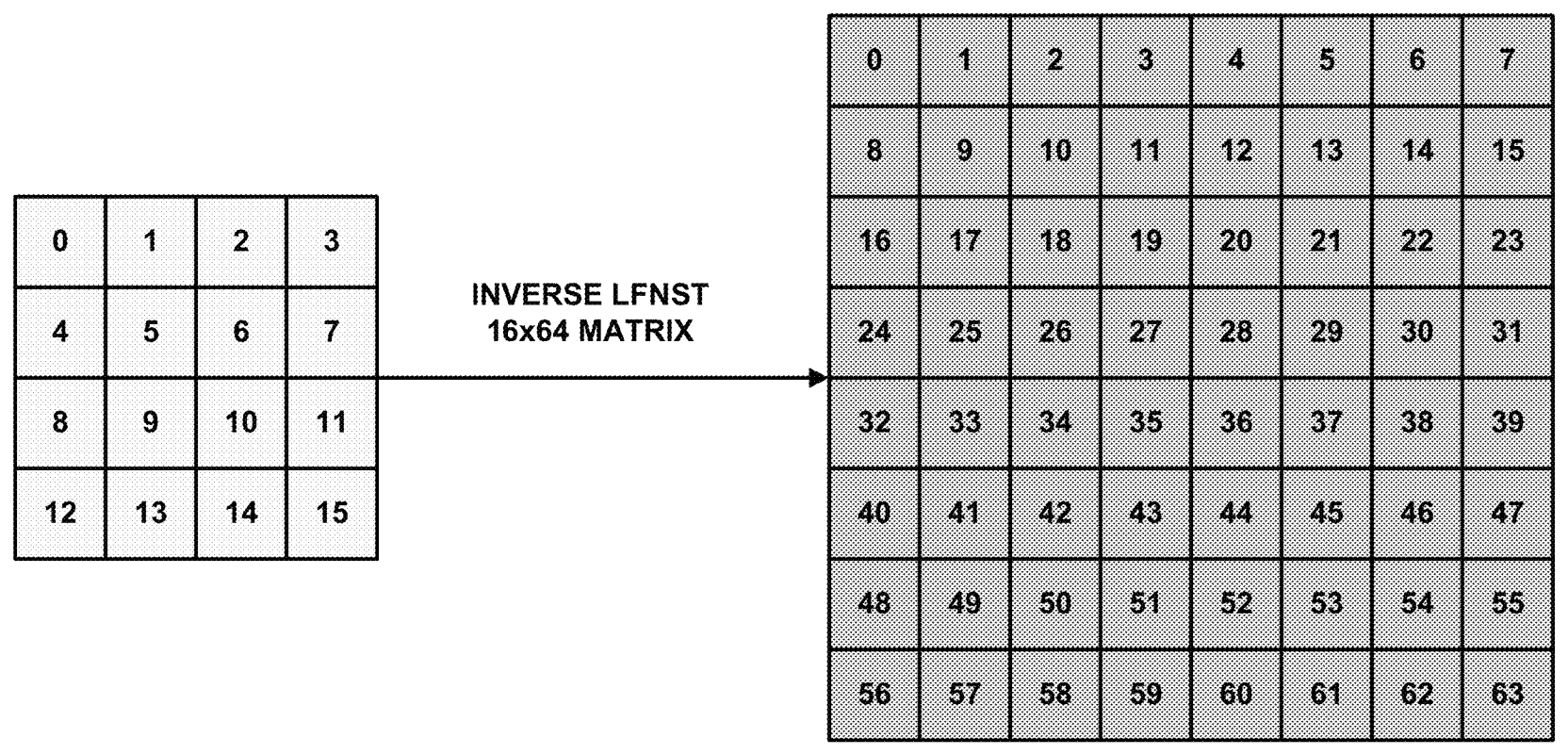

In one example, the number of support samples can be extended from 48 to 64 by keeping the number of allowed coefficients as M=16 as shown in FIG. 10. Note that in this design both video decoder 300 and video encoder 200 may be configured such that only up to 16 coefficients can be non-zero as show in FIG. 8 where input block has 16 samples.

FIG. 9 shows an illustration of 8×8 inverse LFNST used to reconstruct 64 intermediate coefficients from 16 input coefficients. The intermediate coefficients are reorganized in an 8×8-square pattern.

Figure 11:
FIG. 11 shows an example illustration of 8×8 inverse LFNST used to reconstruct 64 intermediate coefficients from 64 input coefficients.

In another example, the number of support samples can be extended from 48 to 64 by further extending the number of allowed coefficients to M=64 as shown in FIG. 11. Note that this design does not allow any normative zeroing out of the coefficients (i.e., both video encoder 200 and video decoder 300 may be configured such that there can be a non-zero coefficient in any position of the square block).

FIG. 11 shows an example illustration of 8×8 inverse LFNST used to reconstruct 64 intermediate coefficients from 64 input coefficients. The intermediate coefficients are reorganized in an 8×8-square pattern.

The input reorganization can be done in raster-scan as in FIG. 8 for M=16 or 64 decoded coefficients, and the output reorganization patterns/scans are specified in arrays g_lfnstRGScan8×8 and g_lfnstRGTranScan8×8, where one of these arrays is used depending on intra mode. In one example, lfnstRGScan is used for intra modes indexed as 0, 1, 2, 3 . . . 34 and lfnstRGTranScan is used for 35, 36, . . . .

*const int* g_lnfstRGScan8x8 [64] =

{

0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63

-continued

```
};

const int g_lfnstRGTranScan8x8[64] =
{
    0, 8, 16, 24, 32, 40, 48, 56, 1, 9, 17, 25, 33, 41, 49, 57, 2, 10, 18, 26, 34, 42,
    50, 58, 3, 11, 19, 27, 35, 43, 51, 59, 4, 12, 20, 28, 36, 44, 52, 60, 5, 13, 21, 29,
    37, 45, 53, 61, 6, 14, 22, 30, 38, 46, 54, 62, 7, 15, 23, 31, 39, 47, 55, 63
};
``` where above scans correspond to raster scan and transposed order, specifically.

This disclosure also describes techniques for extending the number of LFNST candidates.

The number of LFNST sets (S) and candidates (C) can be extended to S=35 and C=3, and the LFNST set (lfnstTrSetIdx) for a given intra mode can be derived according to the following mapping table.

Mapping Rules for Four LFNST Sets an Extended LFNST Design

| predModeIntra | lfnstTrSetIdx |
| --- | --- |
| predModeIntra < 0 | 2 |
| 0 | 0 |
| 1 | 1 |
| 2 | 2 |
| 3 | 3 |
| 4 | 4 |
| 5 | 5 |
| 6 | 6 |
| 7 | 7 |
| 8 | 8 |
| 9 | 9 |
| 10 | 10 |
| 11 | 11 |
| 12 | 12 |
| 13 | 13 |
| 14 | 14 |
| 15 | 15 |
| 16 | 16 |
| 17 | 17 |
| 18 | 18 |
| 19 | 19 |
| 20 | 20 |
| 21 | 21 |
| 22 | 22 |
| 23 | 23 |
| 24 | 24 |
| 25 | 25 |
| 26 | 26 |
| 27 | 27 |
| 28 | 28 |
| 29 | 29 |
| 30 | 30 |
| 31 | 31 |
| 32 | 32 |
| 33 | 33 |
| 34 | 34 |
| 35 | 33 |
| 36 | 32 |
| 37 | 31 |
| 38 | 30 |
| 39 | 29 |
| 40 | 28 |
| 41 | 27 |
| 42 | 26 |
| 43 | 25 |
| 44 | 24 |
| 45 | 23 |
| 46 | 22 |
| 47 | 21 |
| 48 | 20 |
| 49 | 19 |
| 50 | 18 |
| 51 | 17 |
| 52 | 16 |
| 53 | 15 |
| 54 | 14 |
| 55 | 13 |
| 56 | 12 |
| 57 | 11 |
| 58 | 10 |
| 59 | 9 |
| 60 | 8 |
| 61 | 7 |
| 62 | 6 |
| 63 | 5 |
| 64 | 4 |
| 65 | 3 |
| 66 | 2 |

For S=35 and C=3, the collection of 105 LFNST matrices g_lfnst4×4 and g_lfnst8×8 can be a wide variety of different matrices.

This disclosure also describes techniques for improving worst-case matrix multiplication handling.

For hardware implementations, a worst-case number of multiplication (per-transform coefficient) is an important complexity criterion. One example technique to reduce worst-case number of multiplications is to normatively zero-out some of the transform coefficients. However, the zeroing-out process is undesirable unless it is required to meet a certain worst-case number of multiplications.

In VVC Draft 10, the following set of rules are used to maintain the worst-case complexity at 8 multiplications:
  If LFNST is used and TU size is 4×4 or 8×8, then at most 8 non-zero coefficients are allowed, and the rest of the coefficients are normatively zeroed-out.
  Otherwise, if LFNST is used, then at most 16 non-zero coefficients are allowed, and the rest of the coefficients are normatively zeroed-out.
In the specification text, this is reflected as:

$$\text{nonZeroSize} = ((nTbW == 4 \&\& nTbH == 4) \| (nTbW == 8 \&\& nTbH == 8)) ? 8 : 16$$

Let WCM denotes the desired worst-case number of multiplications. The general formula for determining the number of non-zero coefficients allowed (i.e., the level of zeroing out) is:
  NZ=floor((WCM×nTbW×nTbH)/(N×N)) where nTbH and nTbW denotes the height and width of a TU, and N is the transform dimension as described above. This general formula can be reflected in a specification text as follows:

$$\mathrm{nonZeroSize}=(nTbW==nTbH)?NZ:(2\times NZ),$$

where when the TU is square number of allowed coefficients is equal to NZ, otherwise it is equal to 2 times NZ.

If block width and height are equal, then the number of allowed non-zero coefficients may be equal to NZ. Otherwise, the number of allowed non-zero coefficients may be equal to 2 times NZ (e.g., 2×NZ).

To implement the above described techniques, video encoder 200 and video decoder 300 may be configured to determine a number of allowed non-zero coefficients for a block of video data based on a size of the block and obtain a set of dequantized coefficients for the block of video data, wherein the set of dequantized coefficients comprises a first subset of dequantized coefficients that includes non-zero dequantized coefficients and a second subset of dequantized coefficients that includes all zero coefficients. A number of coefficients in the first subset of dequantized coefficients may be equal to the number of allowed non-zero coefficients for the block of video data. Video encoder 200 and video decoder 300 may then apply an inverse LFNST to the first subset of dequantized coefficients to determine a first intermediate subset of coefficients and apply an inverse separable transform to the first intermediate subset of coefficients and at least a portion of the second subset of coefficients to determine a block of reconstructed residual values.

Figure 12:
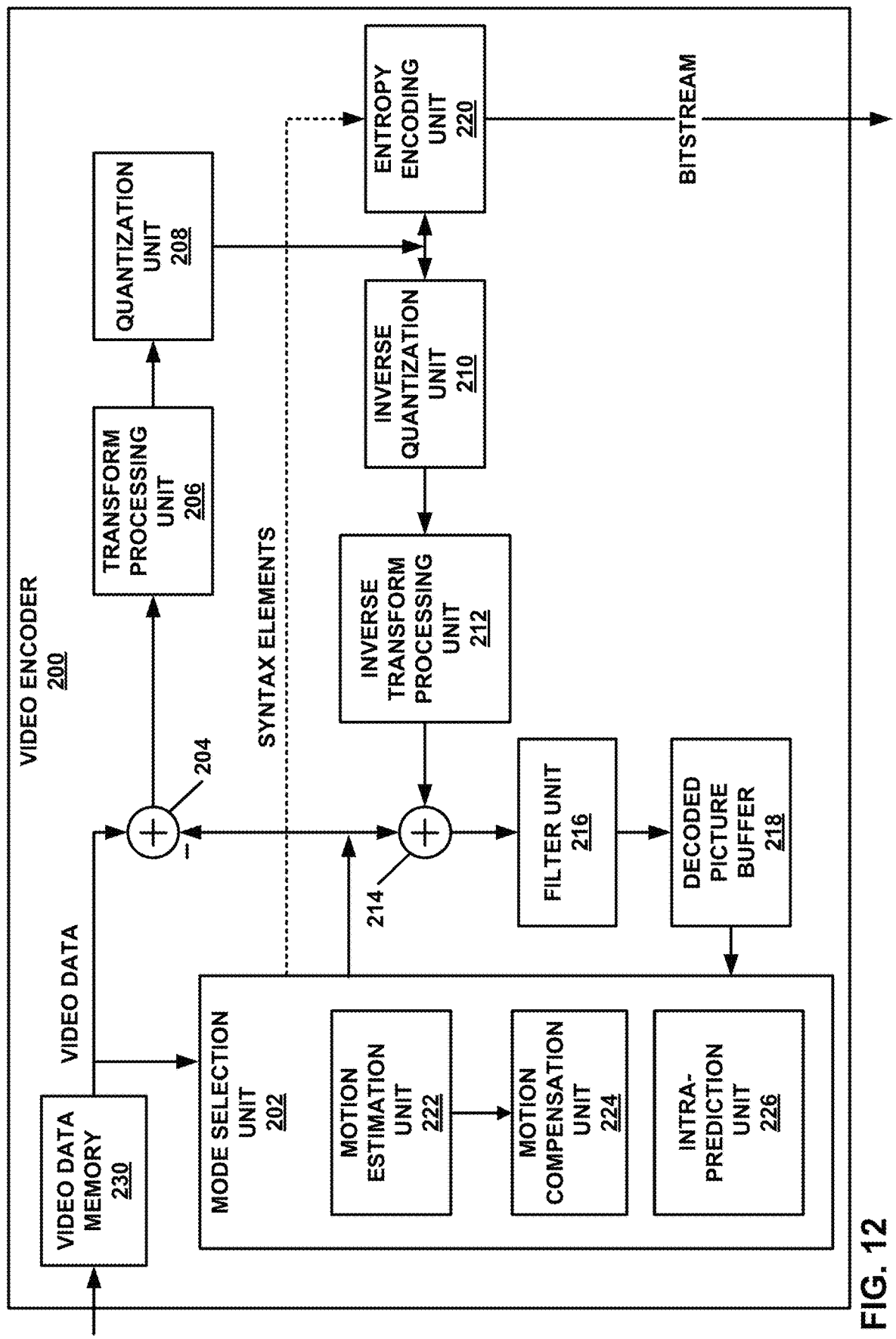
FIG. 12 is a block diagram illustrating an example video encoder that may perform the techniques of this disclosure.

FIG. 12 is a block diagram illustrating an example video encoder 200 that may perform the techniques of this disclosure. FIG. 12 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards.

In the example of FIG. 12, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 12 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. Transform processing unit 206 may, for example, apply LFNSTs and separable transforms in the manner described in this disclosure. In accordance with the techniques of this disclosure, transform processing unit 206 may, for example, determine a number of allowed non-zero coefficients for a block of video data based on a size of the block and, as part of applying LFNSTs and separable transforms, perform a zeroing out process based on the determined number of allowed non-zero coefficients. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Inverse transform processing unit 212 may, for example, apply inverse LFNSTs and inverse separable transforms in the manner described in this disclosure. In accordance with the techniques of this disclosure, inverse transform processing unit 212 may, for example, determine a number of allowed non-zero coefficients for a block of video data based on a size of the block and, as part of applying inverse LFNSTs and inverse separable transforms, perform a zeroing out process based on the determined number of allowed non-zero coefficients.

Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Figure 13:
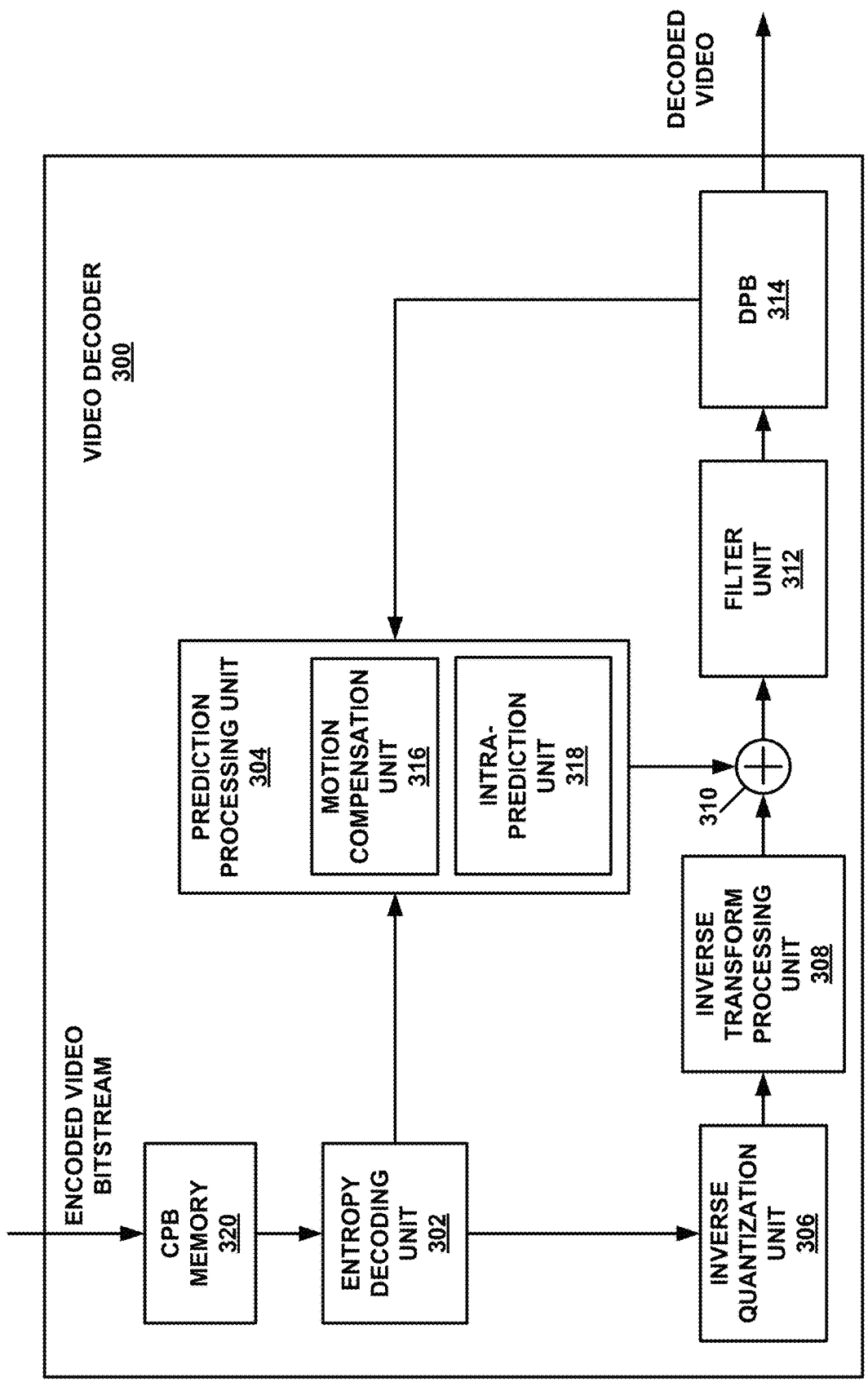
FIG. 13 is a block diagram illustrating an example video decoder that may perform the techniques of this disclosure.

FIG. 13 is a block diagram illustrating an example video decoder 300 that may perform the techniques of this disclosure. FIG. 13 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 13, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 13 are illustrated to assist with understanding the operations performed by video decoder 300. The units may be implemented as fixed-function circuits, programmable circuits, or a combination thereof. Similar to FIG. 12, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block. Inverse transform processing unit 308 may apply inverse LFNSTs and inverse separable transforms in the manner described in this disclosure. In accordance with the techniques of this disclosure, inverse transform processing unit 308 may, for example, determine a number of allowed non-zero coefficients for a block of video data based on a size of the block and, as part of applying inverse LFNSTs and inverse separable transforms, perform a zeroing out process based on the determined number of allowed non-zero coefficients.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 12).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 12). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

Figure 14:
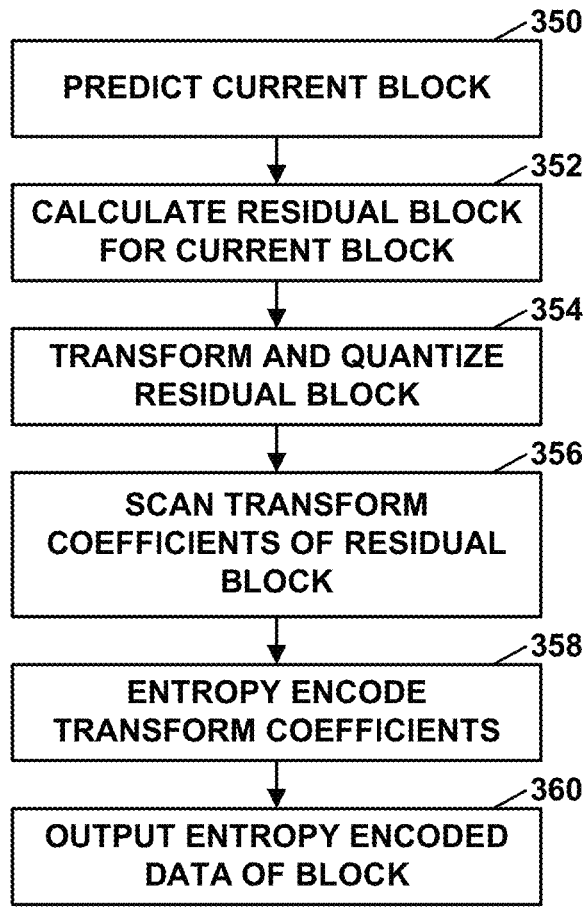
FIG. 14 is a flowchart illustrating an example process for encoding a current block in accordance with the techniques of this disclosure.

FIG. 14 is a flowchart illustrating an example process for encoding a current block in accordance with the techniques of this disclosure. The current block may comprise a current CU. Although described with respect to video encoder 200 (FIGS. 1 and 12), it should be understood that other devices may be configured to perform a process similar to that of FIG. 14.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 15:
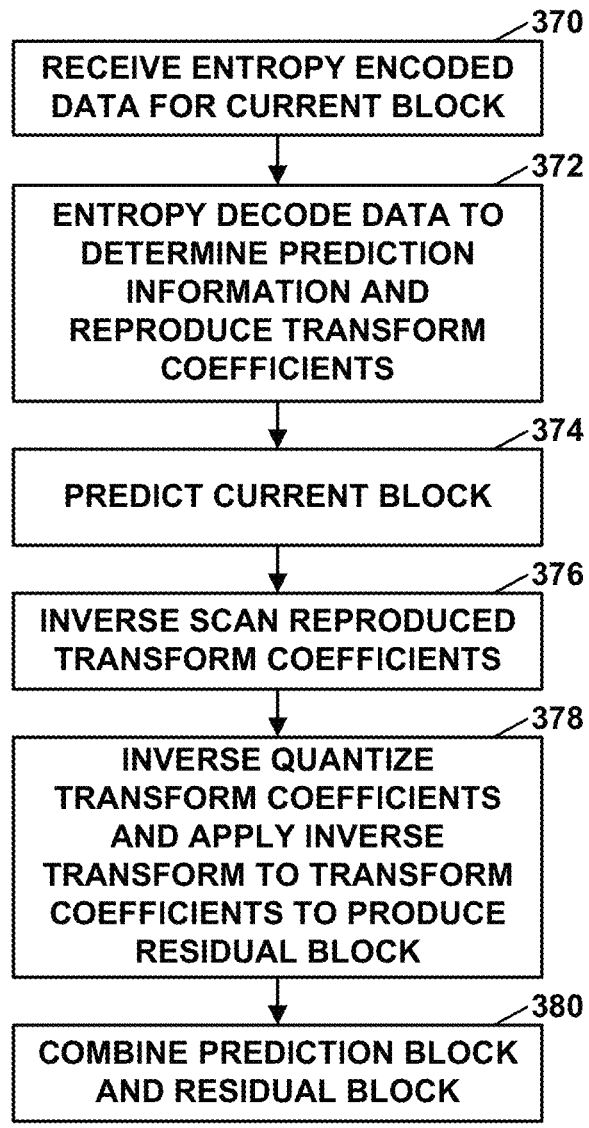
FIG. 15 is a flowchart illustrating an example process for decoding a current block in accordance with the techniques of this disclosure.

FIG. 15 is a flowchart illustrating an example process for decoding a current block of video data in accordance with the techniques of this disclosure. The current block may comprise a current CU. Although described with respect to video decoder 300 (FIGS. 1 and 13), it should be understood that other devices may be configured to perform a process similar to that of FIG. 15.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). As part of applying the inverse transform, video decoder 300 may, for example, obtain a set of dequantized coefficients for a block of video data, where the set of dequantized coefficients includes a first subset of dequantized coefficients that includes non-zero dequantized coefficients and a second subset of dequantized coefficients that includes all zero coefficients. Video decoder 300 may apply an inverse LFNST to the first subset of dequantized coefficients to determine a first intermediate subset of coefficients and apply an inverse separable transform to the first intermediate subset of coefficients and at least a portion of the second subset of coefficients to determine a block of reconstructed residual values. Video decoder 300 may ultimately decode the current block by combining the prediction block and the residual block (380).

Figure 16:
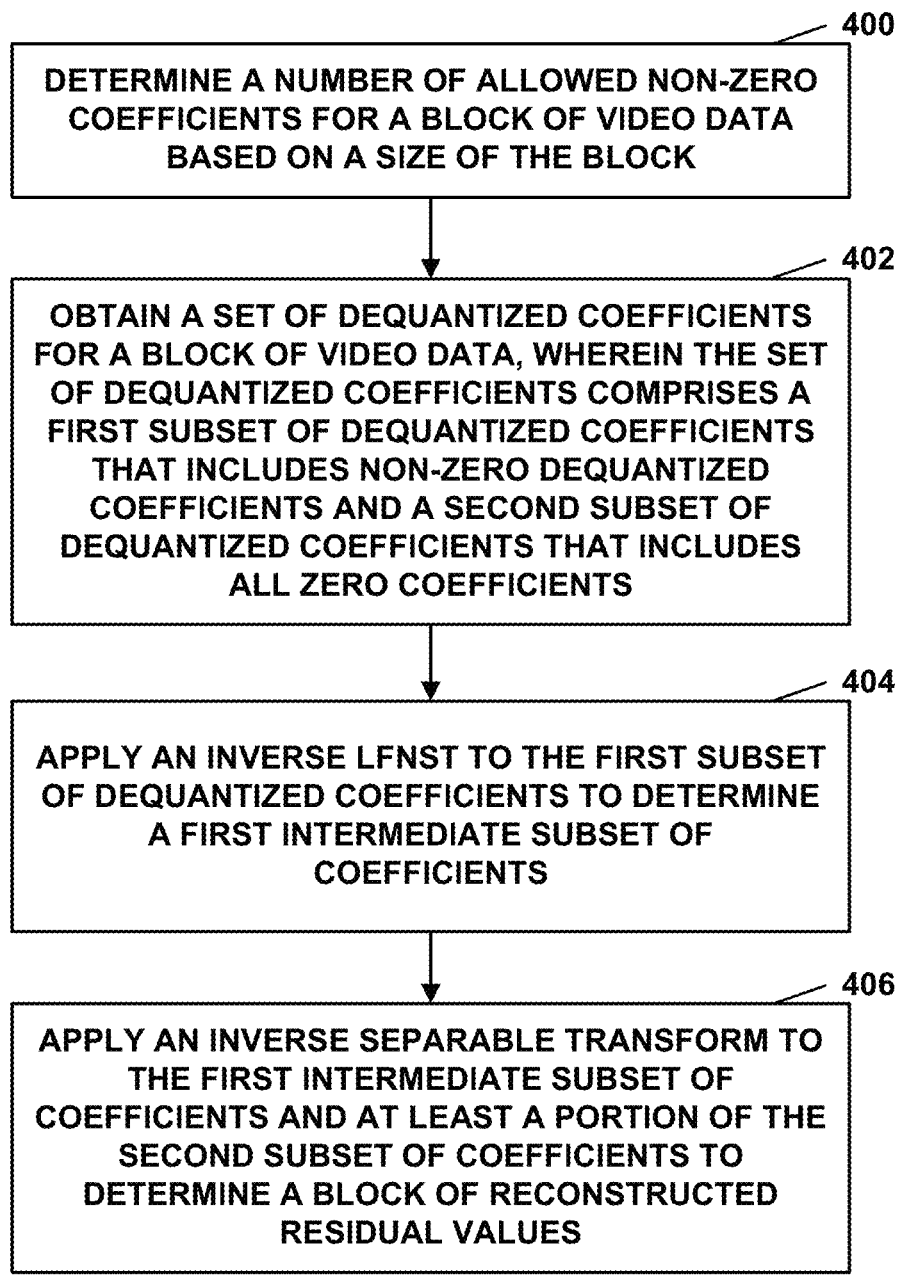
FIG. 16 is a flowchart illustrating an example process for decoding a current block in accordance with the techniques of this disclosure.

FIG. 16 is a flowchart illustrating an example process for decoding a current block of video data in accordance with the techniques of this disclosure. The current block may comprise a current CU. Although described with respect to video decoder 300 (FIGS. 1 and 13), it should be understood that other devices may be configured to perform a process similar to that of FIG. 16. For example, the video decoding loop of a video encoding process performed by video encoder 200 may also perform the techniques of FIG. 16.

Video decoder 300 determines a number of allowed non-zero coefficients for a block of video data based on a size of the block (400). Video decoder 300 may determine the number of allowed non-zero coefficients according to the equation $NZ=floor((WCM \times nTbW \times nTbH)/(N \times N))$, where nTbH represents a height of the block of reconstructed values, nTbW represents a width of the block of reconstructed values, NZ equals the number of allowed non-zero coefficients, and WCM represents a constant value. The first subset of dequantized coefficients may, for example, have NZ coefficients. In some examples, M may equal $2 \times NZ$, and N may equal 64.

Video decoder 300 obtains a set of dequantized coefficients for a block of video data, wherein the set of dequantized coefficients comprises a first subset of dequantized coefficients that includes non-zero dequantized coefficients and a second subset of dequantized coefficients that includes all zero coefficients (402). A number of coefficients in the first subset of dequantized coefficients may be equal to the number of allowed non-zero coefficients for the block of video data.

Video decoder 300 applies an inverse LFNST to the first subset of dequantized coefficients to determine a first intermediate subset of coefficients (404). Video decoder 300 may, for example, determine an intra prediction mode for the block of video data; based on the intra prediction mode, determine a set of inverse LFNST candidates from a plurality of sets; and select the inverse LFNST from the determined set of inverse LFNST candidates. The set of inverse LFNST candidates may, for example, includes 3 candidates and may be determined from a plurality of sets that includes 35 sets. The first subset of dequantized coefficients may include M dequantized coefficients, and the first intermediate subset of coefficients may include N coefficients, with M and N being integer values. As discussed above, in some example, M may equal 16, and N equal 64. In other examples, M may equal 64, and N may equal 64.

Video decoder 300 applies an inverse separable transform to the first intermediate subset of coefficients and at least a portion of the second subset of coefficients to determine a block of reconstructed residual values (406). Video decoder 300 may add the block of reconstructed residual values to a prediction block to form a reconstructed block; apply one or more filters to the reconstructed block to determine a filtered reconstructed block; and output decoded video data that includes the filtered reconstructed block.

The following clauses represent implementations of the techniques and devices described above.

Clause 1. A method of decoding video data, the method comprising: obtaining a set of dequantized coefficients for a block of video data, wherein the set of dequantized coefficients comprises a first subset of dequantized coefficients that includes non-zero dequantized coefficients and a second subset of dequantized coefficients that includes all zero coefficients; applying an inverse low-frequency non-separable transform (LFNST) to the first subset of dequantized coefficients to determine a first intermediate subset of coefficients; and applying an inverse separable transform to the first intermediate subset of coefficients and at least a portion of the second subset of coefficients to determine a block of reconstructed residual values.

Clause 2. The method of clause 1, wherein the first subset of dequantized coefficients M comprises dequantized coefficients, and wherein first intermediate subset of coefficients comprises N coefficients, wherein M and N are integer values.

Clause 3. The method of clause 2, wherein M=16 and N=64.

Clause 4. The method of clause 2, wherein M=64 and N=64.

Clause 5. The method of any of clauses 1-4, further comprising: determining an intra prediction mode for the block of video data; based on the intra prediction mode, determining a set of inverse LFNST candidates from a plurality of sets; and selecting the inverse LFNST from the determined set of inverse LFNST candidates.

Clause 6. The method of clause 5, wherein the set of inverse LFNST candidates includes 3 candidates.

Clause 7. The method of clause 5 or 6, wherein the plurality of sets includes 35 sets.

Clause 8. The method of any of clauses 2-7, further comprising: determining a minimum number of allowed non-zero coefficients according to the equation NZ=floor((WCM×nTbW×nTbH)/(N×N)), wherein nTbH represents a height of the block of reconstructed values, nTbW represents a width of the block of reconstructed values, NZ equals the minimum number of allowed non-zero coefficients and WCM represents a constant value.

Clause 9. The method of clause 8, wherein the first subset of dequantized coefficients has NZ coefficients.

Clause 10. The method of clauses 2 and 8 or clauses 2 and 9, wherein M=2×NZ and N=64.

Clause 11. A device for coding video data, the device comprising one or more means for performing the method of any of clauses 1-10.

Clause 12. The device of clause 11, wherein the one or more means comprise one or more processors implemented in circuitry.

Clause 13. The device of any of clauses 11 and 12, further comprising a memory to store the video data.

Clause 14. The device of any of clauses 11-13, further comprising a display configured to display decoded video data.

Clause 15. The device of any of clauses 11-14, wherein the device comprises one or more of a camera, a computer, a mobile device, a broadcast receiver device, or a set-top box.

Clause 16. The device of any of clauses 11-15, wherein the device comprises a video decoder.

Clause 17. The device of any of clauses 11-16, wherein the device comprises a video encoder.

Clause 18. A computer-readable storage medium having stored thereon instructions that, when executed, cause one or more processors to perform the method of any of clauses 1-10.

Clause 19. A method of decoding video data, the method comprising: determining a number of allowed non-zero coefficients for a block of video data based on a size of the block; obtaining a set of dequantized coefficients for the block of video data, wherein the set of dequantized coefficients comprises a first subset of dequantized coefficients that includes non-zero dequantized coefficients and a second subset of dequantized coefficients that includes all zero coefficients, wherein a number of coefficients in the first subset of dequantized coefficients is equal to the number of allowed non-zero coefficients for the block of video data; applying an inverse low-frequency non-separable transform (LFNST) to the first subset of dequantized coefficients to determine a first intermediate subset of coefficients; and applying an inverse separable transform to the first intermediate subset of coefficients and at least a portion of the second subset of coefficients to determine a block of reconstructed residual values.

Clause 20. The method of clause 19, further comprising: determining an intra prediction mode for the block of video data; based on the intra prediction mode, determining a set of inverse LFNST candidates from a plurality of sets; and selecting the inverse LFNST from the determined set of inverse LFNST candidates.

Clause 21. The method of clause 20, wherein the set of inverse LFNST candidates includes 3 candidates.

Clause 22. The method of clause 20 or 21, wherein the plurality of sets includes 35 sets.

Clause 23. The method of any of clauses 19-22, wherein the first subset of dequantized coefficients comprises M dequantized coefficients, and wherein first intermediate subset of coefficients comprises N coefficients, wherein M and N are integer values.

Clause 24. The method of clause 23, wherein M=16 and N=64.

Clause 25. The method of clause 23, wherein M=64 and N=64.

Clause 26. The method of any of clauses 23-25, further comprising: determining the number of allowed non-zero coefficients according to the equation NZ=floor((WCM×nTbW×nTbH)/(N×N)), wherein nTbH represents a height of the block of reconstructed values, nTbW represents a width of the block of reconstructed values, NZ equals the number of allowed non-zero coefficients and WCM represents a constant value.

Clause 27. The method of clause 26, wherein the first subset of dequantized coefficients has NZ coefficients.

Clause 28. The method of clause 26 or 27, wherein M=2×NZ and N=64.

Clause 29. The method of any of clauses 19-28, further comprising: adding the block of reconstructed residual values to a prediction block to form a reconstructed block;

applying one or more filters to the reconstructed block to determine a filtered reconstructed block; and outputting decoded video data that includes the filtered reconstructed block.

Clause 30. The method of any of clauses 19-29 wherein the method is performed as part of a video encoding process.

Clause 31. A device for decoding video data, the device comprising: a memory configured to store video data; one or more processors implemented in circuitry and configured to: determine a number of allowed non-zero coefficients for a block of video data based on a size of the block; obtain a set of dequantized coefficients for the block of video data, wherein the set of dequantized coefficients comprises a first subset of dequantized coefficients that includes non-zero dequantized coefficients and a second subset of dequantized coefficients that includes all zero coefficients, wherein a number of coefficients in the first subset of dequantized coefficients is equal to the number of allowed non-zero coefficients for the block of video data; apply an inverse low-frequency non-separable transform (LFNST) to the first subset of dequantized coefficients to determine a first intermediate subset of coefficients; and apply an inverse separable transform to the first intermediate subset of coefficients and at least a portion of the second subset of coefficients to determine a block of reconstructed residual values.

Clause 32. The device of clause 31, wherein the one or more processors are further configured to: determine an intra prediction mode for the block of video data; based on the intra prediction mode, determine a set of inverse LFNST candidates from a plurality of sets; and select the inverse LFNST from the determined set of inverse LFNST candidates.

Clause 33. The device of clause 32, wherein the set of inverse LFNST candidates includes 3 candidates.

Clause 34. The device of clause 32, wherein the plurality of sets includes 35 sets.

Clause 35. The device of any of clauses 31-34, wherein the first subset of dequantized coefficients comprises M dequantized coefficients, and wherein first intermediate subset of coefficients comprises N coefficients, wherein M and N are integer values.

Clause 36. The device of clause 35, wherein M=16 and N=64.

Clause 37. The device of clause 35, wherein M=64 and N=64.

Clause 38. The device of any of clauses 35-37, wherein the one or more processors are further configured to: determine the number of allowed non-zero coefficients according to the equation NZ=floor((WCM×nTbW×nTbH)/(N×N)), wherein nTbH represents a height of the block of reconstructed values, nTbW represents a width of the block of reconstructed values, NZ equals the number of allowed non-zero coefficients and WCM represents a constant value.

Clause 39. The device of clause 35, wherein the first subset of dequantized coefficients has NZ coefficients.

Clause 40. The device of clause 35 or 36, wherein M=2×NZ and N=64.

Clause 41. The device of any of clauses 31-41, wherein the one or more processors are further configured to: add the block of reconstructed residual values to a prediction block to form a reconstructed block; apply one or more filters to the reconstructed block to determine a filtered reconstructed block; and output decoded video data that includes the filtered reconstructed block.

Clause 42. The device of any of clauses 31-41, wherein the device comprises a wireless communication device, further comprising a receiver configured to receive encoded video data.

Clause 43. The device of clause 42, wherein the wireless communication device comprises a telephone handset and wherein the receiver is configured to demodulate, according to a wireless communication standard, a signal comprising the encoded video data.

Clause 44. The device of any of clauses 31-43, further comprising: a display configured to display decoded video data.

Clause 45. The device of any of clauses 31-44, wherein the device comprises one or more of a camera, a computer, a mobile device, a broadcast receiver device, or a set-top box.

Clause 46. The device of any of clauses 31-45, further comprising: a camera configured to capture video data.

Clause 47. The device of any of clauses 31-46, wherein the device comprises a wireless communication device, further comprising a transmitter configured to transmit encoded video data.

Clause 48. The device of clause 47, wherein the wireless communication device comprises a telephone handset and wherein the transmitter is configured to modulate, according to a wireless communication standard, a signal comprising the encoded video data.

Clause 49. A computer-readable storage medium storing instructions that when executed by one or more processors cause the one or more processors to: determine a number of allowed non-zero coefficients for a block of video data based on a size of the block; obtain a set of dequantized coefficients for the block of video data, wherein the set of dequantized coefficients comprises a first subset of dequantized coefficients that includes non-zero dequantized coefficients and a second subset of dequantized coefficients that includes all zero coefficients, wherein a number of coefficients in the first subset of dequantized coefficients is equal to the number of allowed non-zero coefficients for the block of video data; apply an inverse low-frequency non-separable transform (LFNST) to the first subset of dequantized coefficients to determine a first intermediate subset of coefficients; and apply an inverse separable transform to the first intermediate subset of coefficients and at least a portion of the second subset of coefficients to determine a block of reconstructed residual values.

Clause 50. A device for decoding video data, the device comprising: means for determining a number of allowed non-zero coefficients for a block of video data based on a size of the block; means for obtaining a set of dequantized coefficients for the block of video data, wherein the set of dequantized coefficients comprises a first subset of dequantized coefficients that includes non-zero dequantized coefficients and a second subset of dequantized coefficients that includes all zero coefficients, wherein a number of coefficients in the first subset of dequantized coefficients is equal to the number of allowed non-zero coefficients for the block of video data; means for applying an inverse low-frequency non-separable transform (LFNST) to the first subset of dequantized coefficients to determine a first intermediate subset of coefficients; and means for applying an inverse separable transform to the first intermediate subset of coefficients and at least a portion of the second subset of coefficients to determine a block of reconstructed residual values.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining a number of allowed non-zero coefficients for a block of video data based on a size of the block;
   obtaining a set of dequantized coefficients for the block of video data, wherein the set of dequantized coefficients comprises a first subset of dequantized coefficients that includes non-zero dequantized coefficients and a second subset of dequantized coefficients that includes all zero coefficients
   determining an intra prediction mode for the block of video data;
   based on the intra prediction mode, determining a set of inverse LFNST candidates from a plurality of sets, wherein the plurality of sets includes 35 sets, and the determining comprising determining an index indicative of the set of inverse LFNST candidates from the plurality of sets based on the inter prediction mode, and wherein determining the index based on the intra prediction mode comprises:
      for values of the intra prediction mode between 0 and 34, determining the index to be equal to the value of the intra prediction mode; and
      for values of the intra prediction mode between 35 and 66, determining the index to be equal to 68 minus the value of the intra prediction mode;
   selecting an inverse LFNST from the determined set of inverse LFNST candidates,
   applying the inverse low-frequency non-separable transform (LFNST) to the first subset of dequantized coefficients to determine a first intermediate subset of coefficients; and
   applying an inverse separable transform to the first intermediate subset of coefficients and at least a portion of the second subset of coefficients to determine a block of reconstructed residual values.

2. The method of claim 1, wherein the set of inverse LFNST candidates includes 3 candidates.

3. The method of claim 1, wherein the first subset of dequantized coefficients comprises M dequantized coefficients, and wherein first intermediate subset of coefficients comprises N coefficients, wherein M and N are integer values.

4. The method of claim 2, wherein M=16 and N=64.

5. The method of claim 2, wherein M=64 and N=64.

6. The method of claim 2, further comprising:
   determining the number of allowed non-zero coefficients according to the equation NZ=floor((WCM×nTbW×nTbH)/(N×N)), wherein nTbH represents a height of the block of reconstructed values, nTbW represents a width of the block of reconstructed values, NZ equals the number of allowed non-zero coefficients and WCM represents a constant value.

7. The method of claim 6, wherein the first subset of dequantized coefficients has NZ coefficients.

8. The method of claim 6, wherein M=2×NZ and N=64.

9. The method of claim 1, further comprising:
adding the block of reconstructed residual values to a prediction block to form a reconstructed block;
applying one or more filters to the reconstructed block to determine a filtered reconstructed block; and
outputting decoded video data that includes the filtered reconstructed block.

10. The method of claim 1, wherein the method is performed as part of a video encoding process.

11. A device for decoding video data, the device comprising:
a memory configured to store video data;
one or more processors implemented in circuitry and configured to:
determine a number of allowed non-zero coefficients for a block of video data based on a size of the block;
obtain a set of dequantized coefficients for the block of video data, wherein the set of dequantized coefficients comprises a first subset of dequantized coefficients that includes non-zero dequantized coefficients and a second subset of dequantized coefficients that includes all zero coefficients;
determine an intra prediction mode for the block of video data;
based on the intra prediction mode, determine a set of inverse LFNST candidates from a plurality of sets, wherein the plurality of sets includes 35 sets, wherein to determine the set, the one or more processors is configured to determine an index indicative of the set of inverse LFNST candidates from the plurality of sets based on the inter prediction mode, and wherein to
determine the index based on the intra prediction mode, the one or more processors is configured to:
for values of the intra prediction mode between 0 and 34, determine the index to be equal to the value of the intra prediction mode; and
for values of the intra prediction mode between 35 and 66, determine the index to be equal to 68 minus the value of the intra prediction mode;
select an inverse LFNST from the determined set of inverse LFNST candidates;
apply the inverse low-frequency non-separable transform (LFNST) to the first subset of dequantized coefficients to determine a first intermediate subset of coefficients; and
apply an inverse separable transform to the first intermediate subset of coefficients and at least a portion of the second subset of coefficients to determine a block of reconstructed residual values.

12. The device of claim 11, wherein the set of inverse LFNST candidates includes 3 candidates.

13. The device of claim 11, wherein the first subset of dequantized coefficients comprises M dequantized coefficients, and wherein first intermediate subset of coefficients comprises N coefficients, wherein M and N are integer values.

14. The device of claim 13, wherein M=16 and N=64.

15. The device of claim 13, wherein M=64 and N=64.

16. The device of claim 13, wherein the one or more processors are further configured to:
determine the number of allowed non-zero coefficients according to the equation NZ=floor((WCM×nTbW×nTbH)/(N×N)), wherein nTbH represents a height of the block of reconstructed values, nTbW represents a width of the block of reconstructed values, NZ equals the number of allowed non-zero coefficients and WCM represents a constant value.

17. The device of claim 13, wherein the first subset of dequantized coefficients has NZ coefficients.

18. The device of claim 13, wherein M=2×NZ and N=64.

19. The device of claim 11, wherein the one or more processors are further configured to:
add the block of reconstructed residual values to a prediction block to form a reconstructed block;
apply one or more filters to the reconstructed block to determine a filtered reconstructed block; and
output decoded video data that includes the filtered reconstructed block.

20. The device of claim 11, wherein the device comprises a wireless communication device, further comprising a receiver configured to receive encoded video data.

21. The device of claim 20, wherein the wireless communication device comprises a telephone handset and wherein the receiver is configured to demodulate, according to a wireless communication standard, a signal comprising the encoded video data.

22. The device of claim 11, further comprising:
a display configured to display decoded video data.

23. The device of claim 11, wherein the device comprises one or more of a camera, a computer, a mobile device, a broadcast receiver device, or a set-top box.

24. The device of claim 11, further comprising:
a camera configured to capture video data.

25. The device of claim 11, wherein the device comprises a wireless communication device, further comprising a transmitter configured to transmit encoded video data.

26. The device of claim 25, wherein the wireless communication device comprises a telephone handset and wherein the transmitter is configured to modulate, according to a wireless communication standard, a signal comprising the encoded video data.

27. A non-transitory computer-readable storage medium storing instructions that when executed by one or more processors cause the one or more processors to:
determine a number of allowed non-zero coefficients for a block of video data based on a size of the block;
obtain a set of dequantized coefficients for the block of video data, wherein the set of dequantized coefficients comprises a first subset of dequantized coefficients that includes non-zero dequantized coefficients and a second subset of dequantized coefficients that includes all zero coefficients;
determine an intra prediction mode for the block of video data;
based on the intra prediction mode, determine a set of inverse LFNST candidates from a plurality of sets, wherein the plurality of sets includes 35 sets, wherein to determine the set, the instructions cause the one or more processors to determine an index indicative of the set of inverse LFNST candidates from the plurality of sets based on the inter prediction mode, and wherein to determine the index based on the intra prediction mode, the instructions cause the one or more processors to:
for values of the intra prediction mode between 0 and 34, determine the index to be equal to the value of the intra prediction mode; and
for values of the intra prediction mode between 35 and 66, determine the index to be equal to 68 minus the value of the intra prediction mode;
select an inverse LFNST from the determined set of inverse LFNST candidates;

apply the inverse low-frequency non-separable transform (LFNST) to the first subset of dequantized coefficients to determine a first intermediate subset of coefficients; and apply an inverse separable transform to the first intermediate subset of coefficients and at least a portion of the second subset of coefficients to determine a block of reconstructed residual values.

28. A device for decoding video data, the device comprising:

means for determining a number of allowed non-zero coefficients for a block of video data based on a size of the block;

means for obtaining a set of dequantized coefficients for the block of video data, wherein the set of dequantized coefficients comprises a first subset of dequantized coefficients that includes non-zero dequantized coefficients and a second subset of dequantized coefficients that includes all zero coefficients;

means for determining an intra prediction mode for the block of video data;

means for determining, based on the intra prediction mode, a set of inverse LFNST candidates from a plurality of sets, wherein the plurality of sets includes 35 sets, wherein the means for determining the set of inverse LFNST candidates comprises means for determining an index indicative of the set of inverse LFNST candidates from the plurality of sets based on the inter prediction mode, and the means for determining the index comprising means for determining the index to be equal to:

for values of the intra prediction mode between 0 and 34, the value of the intra prediction mode; and for values of the intra prediction mode between 35 and 66, 68 minus the value of the intra prediction mode;

means for selecting an inverse LFNST from the determined set of inverse LFNST candidates;

means for applying the inverse low-frequency non-separable transform (LFNST) to the first subset of dequantized coefficients to determine a first intermediate subset of coefficients; and means for applying an inverse separable transform to the first intermediate subset of coefficients and at least a portion of the second subset of coefficients to determine a block of reconstructed residual values.

\* \* \* \* \*